US011237617B2

(12) United States Patent
Palmer

(10) Patent No.: US 11,237,617 B2
(45) Date of Patent: Feb. 1, 2022

(54) ARBITRATION TECHNIQUES FOR MANAGED MEMORY

(71) Applicant: Micron Technology, Inc., Boise, ID (US)

(72) Inventor: David Aaron Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 147 days.

(21) Appl. No.: 16/293,295

(22) Filed: Mar. 5, 2019

(65) Prior Publication Data

US 2020/0209944 A1    Jul. 2, 2020

Related U.S. Application Data

(60) Provisional application No. 62/786,944, filed on Dec. 31, 2018.

(51) Int. Cl.
| | |
|---|---|
| *G06F 1/32* | (2019.01) |
| *G06F 3/06* | (2006.01) |
| *G06F 9/48* | (2006.01) |
| *G06F 9/54* | (2006.01) |
| *G06F 9/38* | (2018.01) |
| *G06F 1/3234* | (2019.01) |
| *G06F 1/3225* | (2019.01) |

(52) U.S. Cl.
CPC .......... *G06F 1/3275* (2013.01); *G06F 1/3225* (2013.01); *G06F 3/0625* (2013.01); *G06F 3/0659* (2013.01); *G06F 9/3836* (2013.01); *G06F 9/4893* (2013.01); *G06F 9/544* (2013.01)

(58) Field of Classification Search
CPC .... G06F 1/3275; G06F 1/3225; G06F 9/3836; G06F 9/544; G06F 9/4893; G06F 3/0625
See application file for complete search history.

(56) References Cited

U.S. PATENT DOCUMENTS 9,223,373 B2 * 12/2015 Thakkar ................ G06F 1/3275
9,405,355 B2    8/2016 Bahirat
9,477,586 B1 * 10/2016 Hedinger .............. G06F 1/3225
(Continued)

FOREIGN PATENT DOCUMENTS

| CN | 111381777 A | 7/2020 |
| CN | 111382097 A | 7/2020 |
| CN | 111383679 A | 7/2020 |

OTHER PUBLICATIONS

U.S. Appl. No. 16/293,227, filed Mar. 5, 2019, Arbitration Techniques for Managed Memory.
U.S. Appl. No. 16/293,261, filed Mar. 5, 2019, Arbitration Techniques for Managed Memory.
Seonyeong, Park, et al., "A Comprehensive Study of Energy Efficiency and Performance of Flash-based SSD", Journal of Systems Architecture, Elsevier, (Feb. 25, 2011), 354-365.
(Continued)

*Primary Examiner* — Jaweed A Abbaszadeh
*Assistant Examiner* — Cheri L Harrington
(74) *Attorney, Agent, or Firm* — Schwegman Lundberg & Woessner, P.A.

(57) ABSTRACT

Devices and techniques for arbitrating operation of memory devices in a managed NAND memory system to conform the operation to a power budget. In an example, a method can include receiving an operation change indication for a NAND memory operation at power management circuitry of a NAND memory system, and summing a power credit to a value of a first register associated with the operation change indication to provide an indication of instantaneous power consumption of the NAND memory system as the value of the first register.

18 Claims, 12 Drawing Sheets

(56) References Cited

U.S. PATENT DOCUMENTS

| | | | | |
|---|---|---|---|---|
| 9,760,311 | B1* | 9/2017 | Amir | G06F 3/0616 |
| 10,228,746 | B1* | 3/2019 | Ram | G06F 1/3212 |
| 2005/0210304 | A1* | 9/2005 | Hartung | G06F 3/0634 |
| | | | | 713/320 |
| 2012/0185187 | A1 | 7/2012 | Parakulam et al. | |
| 2013/0262745 | A1 | 10/2013 | Lin et al. | |
| 2014/0032939 | A1 | 1/2014 | Jeddeloh | |
| 2016/0091957 | A1* | 3/2016 | Partiwala | G11C 7/1072 |
| | | | | 713/323 |
| 2016/0139639 | A1* | 5/2016 | Dash | G06F 3/0688 |
| | | | | 714/773 |
| 2016/0372160 | A1* | 12/2016 | Lehmann | G06F 1/329 |
| 2017/0069395 | A1* | 3/2017 | Yao | G11C 29/52 |
| 2017/0269669 | A1* | 9/2017 | Choi | G11C 16/30 |
| 2018/0181186 | A1 | 6/2018 | Diefenbaugh et al. | |
| 2019/0065086 | A1* | 2/2019 | Margetts | G06F 1/329 |
| 2019/0235774 | A1* | 8/2019 | Benisty | G06F 1/3275 |
| 2020/0012451 | A1 | 1/2020 | Benisty | |
| 2020/0104062 | A1* | 4/2020 | Cho | G06F 3/0659 |
| 2020/0133567 | A1 | 4/2020 | Hutchison et al. | |
| 2020/0210107 | A1 | 7/2020 | Palmer | |
| 2020/0210108 | A1 | 7/2020 | Palmer | |

OTHER PUBLICATIONS

U.S. Appl. No. 16/293,227, Non Final Office Action dated Jun. 17, 2020, 22 pgs.

U.S. Appl. No. 16/293,227, Response filed Sep. 17, 2020 to Non Final Office Action dated Jun. 17, 2020, 14 pgs.

U.S. Appl. No. 16/293,227, Final Office Action dated Oct. 29, 2020, 31 pgs.

U.S. Appl. No. 16/293,227, Response filed Dec. 29, 2020 to Final Office Action dated Oct. 29, 2020, 13 pgs.

U.S. Appl. No. 16/293,227, Non Final Office Action dated Mar. 2, 2021, 25 pgs.

U.S. Appl. No. 16/293,227, Response filed May 28, 2021 to Non Final Office Action dated Mar. 2, 2021, 15 pgs.

U.S. Appl. No. 16/293,261, Non Final Office Action dated May 13, 2020, 22 pgs.

U.S. Appl. No. 16/293,261, Response filed Nov. 13, 2020 to Non Final Office Action dated May 13, 2020, 23 pgs.

U.S. Appl. No. 16/293,261, Final Office Action dated Mar. 16, 2021, 23 pgs.

U.S. Appl. No. 16/293,261, Response filed Jun. 16, 2021 to Final Office Action dated Mar. 16, 2021, 9 pgs.

* cited by examiner

US 11,237,617 B2

ARBITRATION TECHNIQUES FOR MANAGED MEMORY

PRIORITY

This application claims the benefit of priority to U.S. Provisional Patent Application No. 62/786,944, filed Dec. 31, 2018, and titled, ARBITRATION TECHNIQUES FOR MANAGED MEMORY, which is incorporated herein by reference in its entirety.

BACKGROUND

Memory devices can be provided as internal, semiconductor, integrated circuits in computers or other electronic devices. There are many different types of memory, including volatile and non-volatile memory. Volatile memory requires power to maintain its data, and includes random-access memory (RAM), dynamic random-access memory (DRAM), or synchronous dynamic random-access memory (SDRAM), among others. Non-volatile memory can retain stored data when not powered, and includes flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), magneto resistive random-access memory (MRAM), or storage class (e.g., memristor) memory, among others.

Flash memory is utilized as non-volatile memory for a wide range of electronic applications. Flash memory devices typically include one or more groups of one-transistor, floating gate or charge trap memory cells that allow for high memory densities, high reliability, and low power consumption. Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values).

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to refer to any memory cell that can store more than one bit of data per cell (i.e., that can represent more than two programmed states).

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Systems that can make use of managed NAND memory devices can come in many forms. Some systems promote high performance and are designed to continually operate at a sustained high-performance level as requested by a user. Some systems, however, such as mobile systems, can be limited in available power and can include techniques that operate the system within a power budget while attempting to provide high-performance by way of a superior user experience.

The present inventors have recognized that operations of managed NAND memory devices can represent a significant portion of a power budget, especially power used to transfer data over a communication channel, or communication interface, connecting a host device with a NAND memory device. This can be especially true for recent managed NAND that may be capable of, for example, simultaneous read commands over multiple commination channels to each plane of one or more NAND die. To provide the best user experience, it makes sense to keep all the system components, including all memory die, powered at all times. However, keeping all the memory die of manage NAND device powered and operating can use a relatively large amount of power, and in turn, significantly reduce user experience when the battery of the mobile device fails to provide power after a relatively short time. To prevent premature consumption of battery power, systems, such as mobile systems, can budget power to various sub-systems.

This document addresses various techniques for arbitrating which die of a managed NAND memory device are active to comply with a given power budget while providing the best user experience. A first technique monitors active time and de-active time for each memory die and arbitrates based on those times. A second technique monitors workload tasks for each die and allows a powered NAND array to be in a read mode or a write triode but not both such that the power budget can be used with a finer resolution as the power profile of each NAND array executing the same function is better estimated than allowing the powered NAND array to operate with a mix of reads and writes. A third technique can allow for the opportunity estimate and execute operation of manage NAND memory with an even a finer power estimate resolution so as to better ensure the power budget is net while also providing a maximum user experience for that power budget. The third technique can include splitting each of the read operation and the write operation into two sub-operations and corresponding power profiles and then regulating the operations of the managed NAND memory device based on the active and de-active times of the memory device die and a credit system related to the power profiles of the sub-operations.

Figure 1:
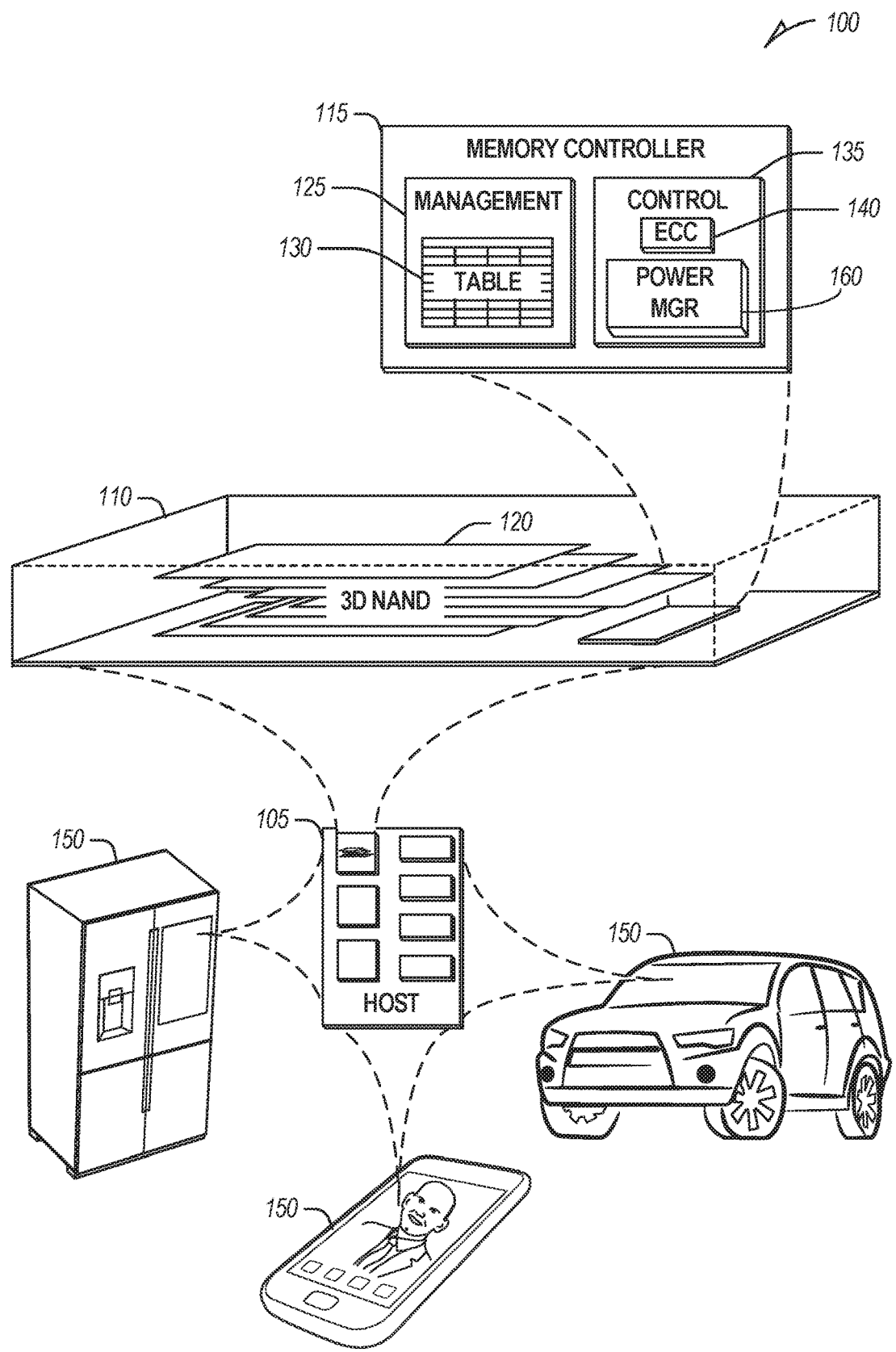
FIG. 1 illustrates an example of an environment including a memory device upon which one or more embodiments can be implemented.

FIG. 1 illustrates an example of an environment 100 including a host device 105 and a managed memory device 110 configured to communicate with each other over a communication interface. Thus, as described herein, actions ascribed to the host device 105 are external to those of the managed memory device 110, even when, as illustrated, the managed memory device 110 is a package within the host device 105. Thus, in some examples, the managed memory device 110 can be included as part of the host 105 (as depicted in FIG. 1) or the managed memory device 110 can be a separate component external to the host device 105. The host device 105 or the managed memory device 110 can be included in a variety of products 150, such as Internet of Things (MT) devices (e.g., a refrigerator or other appliance, sensor, motor or actuator, mobile communication device, automobile, drone, etc.) to support processing, communications, or control of the product 150.

Figure 5:
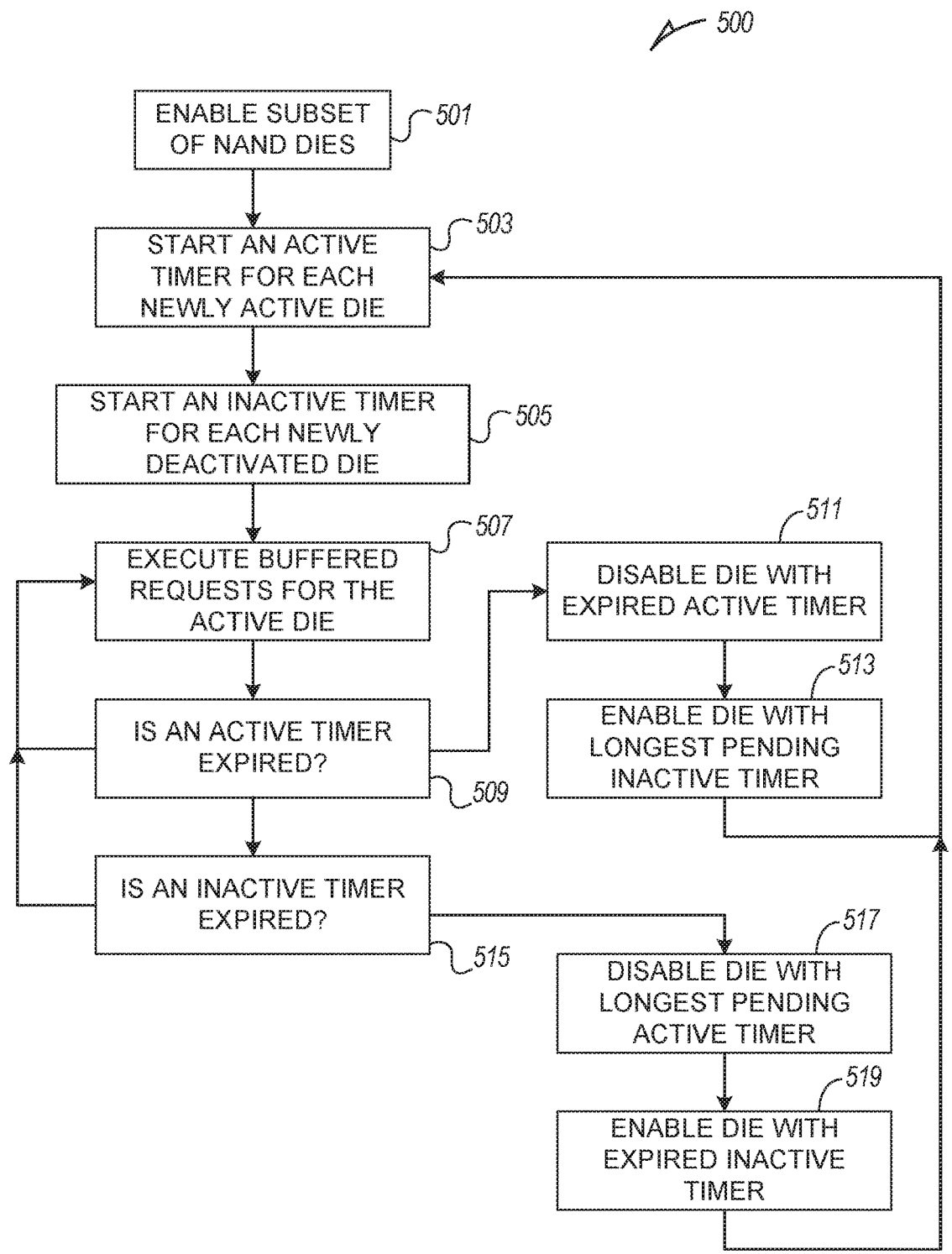
FIG. 5 illustrates generally a flowchart of an example method for a memory controller to arbitrate activation and de-activation of the die of a multiple memory die device to maintain as many active die as possible while still managing power consumption of the memory device to a power budget.

The managed memory device 110 includes a memory controller 115 and a memory array 120 including, for example, a number of individual memory devices (e.g., each memory device being a stack of three-dimensional (3D) NAND die). Thus, the managed memory device 110 includes the memory controller 115 and one or more memory devices—an example of a memory device is illustrated in FIG. 5. In examples without the managed memory device 110, the memory controller 115, or its equivalent, will be part of the host device 105 and external to the package of the memory device or devices that comprise the memory array 120. In 3D architecture semiconductor memory technology, vertical structures are stacked, increasing the number of tiers, physical pages, and accordingly, the density of a given memory device (e.g., a storage device).

In an example, the managed memory device 110 can be a discrete memory or storage device component of the host device 105. In other examples, the managed memory device 110 can be a portion of an integrated circuit (e.g., system on a chip (SOC), etc.), stacked or otherwise included with one or more other components of the host device 105.

One or more communication interface, or channels, can be used to transfer data between the managed memory device 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 can include a host system, an electronic device, a processor, control circuitry, or a memory card reader. In some examples, the host device 105 can be a machine having some portion, or all, of the components discussed in reference to the machine 1100 of FIG. 11. Data can be transferred between the managed memory device 110 and other components over an I/O bus.

The memory controller 115 can receive instructions from processing circuitry (e.g., a processor) of the host device 105, and can communicate with the memory array 120, such as to transfer data to (e.g., write or erase) from (e.g., read) one or more of the memory devices and associated memory cells, planes, sub-blocks, blocks, or pages of the memory array 120. The memory controller 115 can include, among other things, circuitry or firmware, including one or more components or integrated circuits. For example, the memory controller 115 can include one or more circuits, control circuitry, or components configured to control access across the memory array 120 and to provide a translation layer between the host device 105 and the memory devices of the memory array 120. The memory controller 115 can include one or more input/output (I/O) circuits, lines, or interfaces to transfer data to or from the memory array 120. The memory controller 115 can include a memory manager 125 and an array controller 135.

The array controller 135 can include, among other things, circuitry or components configured to control memory operations associated with writing data to, reading data from, or erasing one or more memory cells of the memory devices in the memory array 120. The memory operations can be based on, for example, host commands received from processing circuitry of the host device 105, or internally generated by the memory manager 125 (e.g., in association with wear leveling, error detection or correction, etc.).

In operation, data is typically written to or read from the NAND managed memory device 110 in pages and erased in blocks. However, one or more memory operations (e.g., read, write, erase, etc.) can be performed on larger or smaller groups of memory cells, as desired. The data transfer size of a NAND managed memory device 110 is typically referred to as a page, whereas the data transfer size of a host is typically referred to as a sector.

The array controller 135 can include an error correction code (ECC) component 140, which can include, among other things, an ECC engine or other circuitry configured to detect or correct errors associated with writing data to or reading data from one or more memory cells of the memory devices coupled to the memory controller 115. ECC component 140, for example, can detect or compute a bit-error-rate (BER) associated with performing a number of memory operations. The BER can correspond to bit errors occurring in latches of an I/O bus, internal errors of controller 115, errors occurring in one or more of the memory devices of the managed memory device 110. The memory controller 115 can be configured to actively detect and recover from error occurrences (e.g., bit errors, operation errors, etc.) associated with various operations or storage of data, while maintaining integrity of the data transferred between a processor of the host device 105 and the managed memory device 110, or maintaining integrity of stored data (e.g., using redundant RAID storage, etc.), and can remove (e.g., retire) failing memory resources (e.g., memory cells, memory arrays, pages, blocks, etc.) to prevent future errors. In an example, some of these operations, such as detecting a read fault, can be implemented in a memory control unit of each memory device in the memory array 120.

In certain examples, the controller 115 can include a power manager 160 used to manage power in accordance with embodiments described herein. However, the controller 115 can include various other components not illustrated so as not to obscure embodiments of the present disclosure. Also, although power manager 160 is illustrated as resident on the controller 115, in some embodiments, the power manager 160 may reside elsewhere in the memory system 110 (e.g., as an independent component or resident on a different component of the system). The power manager 160 can be implemented in hardware and/or firmware, for example, and can throttle power in accordance with a number of different power modes or a power budget threshold. In certain examples, the power modes can be based on characteristics such as data priority levels (e.g., whether the data is high priority data, low priority data, garbage collection data, etc.), write amplification associated with the SSD, application type (e.g., some applications may require lower I/O bandwidth than others), and/or programming type (e.g., whether a page of data to be written is a lower page or an upper page), among other characteristics.

The memory manager 125 can include, among other things, circuitry or firmware, such as a number of components or integrated circuits associated with various memory management functions. For purposes of the present description, example memory operation and management functions will be described in the context of NAND memory. Persons skilled in the art will recognize that other forms of non-volatile memory can have analogous memory operations or management functions. Such NAND management functions include wear leveling (e.g., garbage collection or reclamation), error detection (e.g., bit-error-rate (BER) monitoring) or correction, block retirement, or one or more other memory management functions. The memory manager 125 can parse or format host commands (e.g., commands received from processing circuitry of host device 105) into device commands (e.g., commands associated with operation of a memory array, etc.), or generate device commands (e.g., to accomplish various memory management functions) for the array controller 135 or one or more other components of the managed memory device 110. In an example, some of these operations can be implemented in a memory control unit of each memory device in the memory array 120.

The memory manager 125 can include a set of management tables 130 configured to maintain various information associated with one or more component of the managed memory device 110 (e.g., various information associated with a memory array or one or more memory cells coupled to the memory controller 115). For example, the management tables 130 can include information regarding block age, block erase count, error history, error parameter information, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts (e.g., an error parameter) is above a threshold (e.g., an allowable error threshold), the bit error can be referred to as an uncorrectable bit error. The management tables 130 can maintain a count of correctable or uncorrectable bit errors, among other things.

As noted above, the memory array 120 can include one or more memory devices. The individual memory devices can include several memory cells arranged in, for example, a number of devices, planes, sub-blocks, blocks, or pages. As one example, a 48 GB TLC NAND memory device can include 18,592 bytes of data per page (16,384+2208 bytes), 1536 pages per block, 548 blocks per plane, and four or more planes per device. As another example, a 32 GB MLC memory device (storing two bits of data per cell (i.e., four programmable states)) can include 18,592 bytes of data per page (16,384+2208 bytes), 1024 pages per block, 548 blocks per plane, and four planes per device, but with half the required write time and twice the program/erase (P/E) cycles as a corresponding TLC memory device. Other examples can include other numbers or arrangements. In some examples, a memory device, or a portion thereof, can be selectively operated in SLC mode, or in a desired MLC mode (such as TLC, QLC, etc.).

Different types of memory devices can provide for different page sizes or can require different amounts of metadata associated therewith. For example, different memory device types can have different bit error rates, which can lead to different amounts of metadata necessary to ensure integrity of the page of data (e.g., a memory device with a higher bit error rate can require more bytes of error correction code data than a memory device with a lower bit error rate). As an example, a multi-level cell (MLC) NAND flash memory device can have a higher bit error rate than a corresponding single-level cell (SLC) NAND flash memory device. As such, the MLC device can require more metadata bytes for error data than the corresponding SLC device.

Figure 2:
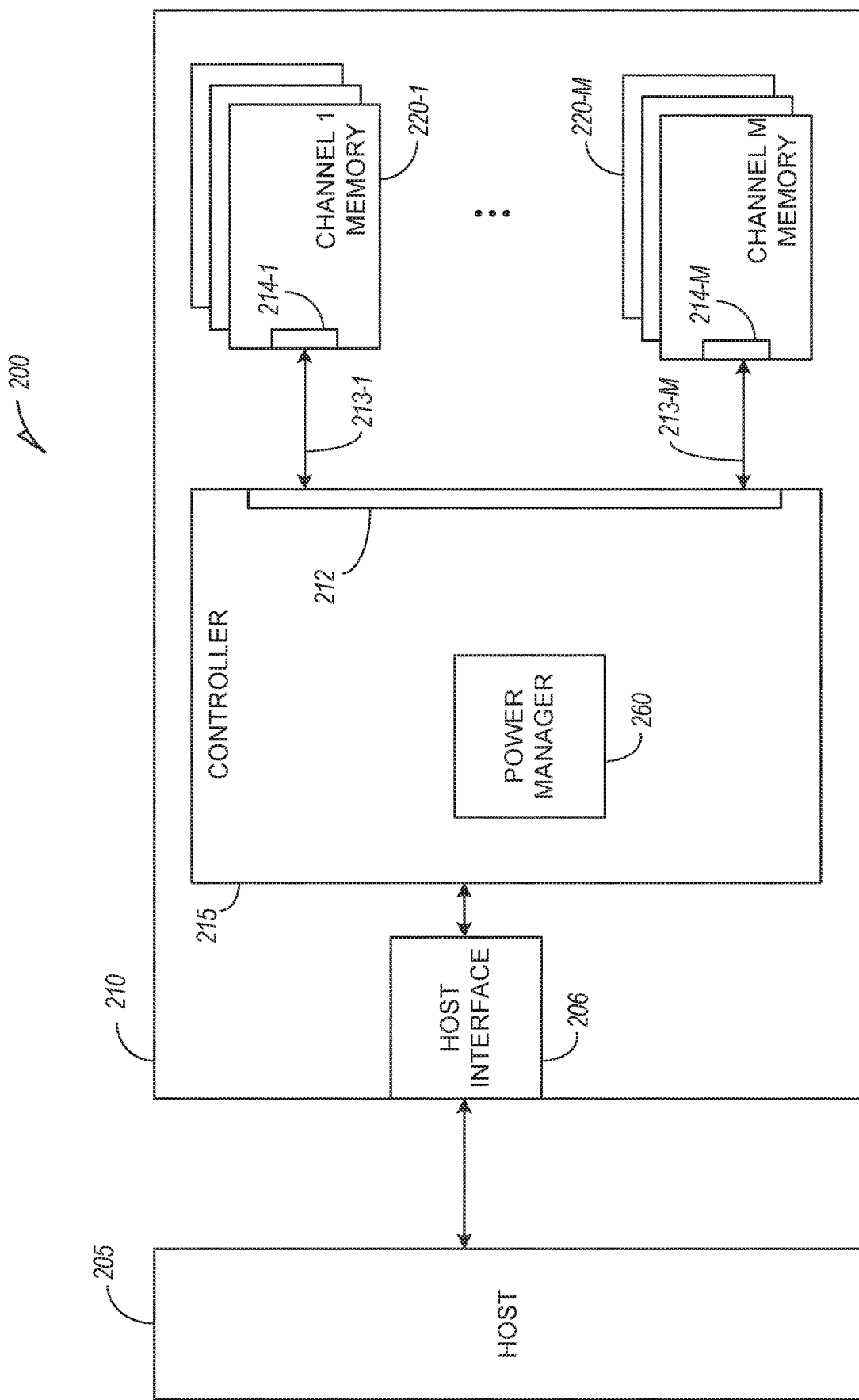
FIG. 2 is an alternative view of an environment including at least one memory system in accordance a number of embodiments of the present disclosure.

FIG. 2 is an alternative view of an environment 200 including at least one memory system 210 in accordance a number of embodiments of the present disclosure. As used herein, a memory system 210, a controller 215, or a memory device 220 might also be separately considered an "apparatus". The memory system 210 can be a solid state drive (SSD), for instance, and can include a host interface 206, a controller 215 (e.g., a processor and/or other control circuitry), and a number of memory devices 220-1, . . . , 220-M (e.g., solid state memory devices such as NAND flash devices), which provide a storage volume for the memory system 210. In a number of embodiments, the controller 215, a memory device 220-1 to 220-M, and/or the host interface 106 can be physically located on a single die or within a single package (e.g., a managed NAND application). Also, in a number of embodiments, a memory (e.g., memory devices 220-1 to 220-M) can include a single memory device. In this example, each of the memory devices 220-1 to 220-M corresponds to a respective memory channel (e.g., CHANNEL 1 MEMORY, . . . , CHANNEL M MEMORY), which can comprise a group of memory devices (e.g., dies or chips); however, embodiments are not so limited.

In certain examples, the controller 210 can be coupled to the host interface 206 and to the memory devices 220-1, ..., 220-M via a respective number of I/O busses 213-1, ..., 213-M. The host interface 206 can be used to transfer data between the memory system 210 and a host 205. The interface 206 can be in the form of a standardized interface. For example, when the memory system 210 is used for data storage in a computing environment 200, the interface 206 can be a serial advanced technology attachment (SATA), a serial attached SCSI (SAS), a peripheral component interconnect express (PCIe), or a universal serial bus (USB), among other connectors and interfaces. In general, however, interface 206 can provide an interface for passing control, address, data, and other signals between the memory system 210 and a host 205 having compatible receptors for the interface 206. Although not shown in FIG. 2, the host interface 206 can include a host bus interface (HBA), which can be coupled to the host 205 via a number of I/O busses, which can be represented by the arrow between the host 205 and interface 206.

Host 205 can be a host system such as a personal laptop computer, a desktop computer, a digital camera, a mobile telephone, or a memory card reader, among various other types of hosts. Host 205 can include a system motherboard and/or backplane and can include a number of memory access devices (e.g., a number of processors).

In certain examples, each bus 213-1, ..., 213-M can be associated with a respective memory channel; however, embodiments are not limited to this configuration. For instance, in a number of embodiments, a single I/O bus can support multiple channels. The I/O busses 213-1 to 213-M can comprise a number of signal lines (e.g., data lines, address lines, control lines, etc.). The controller 210 includes memory interface 212 used to couple the I/O busses 213-1 to 213-M to respective memory devices 220-1 to 220-M (e.g., via corresponding interfaces 214-1 to 214-M). The memory interfaces 212 and/or 214-1 to 214-M can provide physical connections for the signal lines of the busses 213-1 to 213-M and can comprise various components such as driver circuitry (e.g., SSTL drivers, LVCMOS drivers, etc.) and/or ODT circuitry, for instance. The interfaces 212 and/or 214-1 to 214-M may support various signaling standards such as DDR, DDR2, and/or DDR3, among other signaling standards. As an example, the interfaces 212 and 214 and I/O busses 213 can comply with an Open Nand Flash Interface (ONFI).

The controller 215 can communicate with the memory (e.g., memory devices 220-1 to 220-M) to control data read, write, and erase operations, among other operations. The controller 215 can include, for example, a number of components in the form of hardware and/or firmware (e.g., one or more integrated circuits) and/or software for controlling access to the memory and/or for facilitating data transfer between the host 205 and memory. In certain examples, the controller 215 includes a power manager 260 used to manage power in accordance with embodiments described herein. However, the controller 215 can include various other components not illustrated so as not to obscure embodiments of the present disclosure. Also, although power manager 260 is illustrated as resident on the controller 215, in some embodiments, the power manager 260 may reside elsewhere in the memory system 210 (e.g., as an independent component or resident on a different component of the system). The power manager 260 can be implemented in hardware and/or firmware, for example, and can throttle power in accordance with a number of different power modes. For instance, the power modes can be based on characteristics such as data priority levels (e.g., whether the data is high priority data, low priority data, garbage collection data, etc.), write amplification associated with the SSD, application type (e.g., some applications may require lower I/O bandwidth than others), and/or programming type (e.g., whether a page of data to be written is a lower page or an upper page), among other characteristics. Also, in a number of embodiments, the power manager 260 can be used to throttle an I/O bus between the host 205 and controller 215.

The memory (e.g., memory devices 220-1 to 220-M) can include a number of arrays of memory cells. The arrays can be flash arrays with a NAND architecture, for example. However, embodiments are not limited to a particular type of memory array or array architecture. The memory cells can be grouped, for instance, into a number of blocks including a number of physical pages. A number of blocks can be included in a plane of memory cells and an array can include a number of planes. As one example, a memory device may be configured to store 8 KB (kilobytes) of user data per page, 128 pages of user data per block, 2048 blocks per plane, and 16 planes per device.

In embodiments in which the memory devices 220-1 to 220-M comprise flash arrays having a NAND architecture, the arrays can comprise access lines, e.g., word lines and intersecting data lines, e.g., bit lines. The arrays can comprise "strings" of memory cells connected in series source to drain between a source select gate configured to selectively couple a respective string to a common source and a drain select gate configured to selectively couple a respective string to a respective bit line. The memory cells can comprise, for instance, a source, a drain, a charge storage structure (e.g., a floating gate), and a control gate, with the control gates of cells corresponding to a "row" of cells being commonly coupled to a word line. A NOR flash array would be similarly structured with the exception of strings of memory cells being coupled in parallel between select gates.

As described further herein, in a number of embodiments of the present disclosure, a power manager (e.g., power manager 260) can be configured to adjust I/O power consumption associated with transferring data between a controller (e.g., controller 215) and a number of memory devices (e.g., 220-1 to 220-M) by throttling a number of I/O busses (e.g., 213-1 to 213-M) without adjusting a transfer rate of the number of I/O busses.

Figure 3:
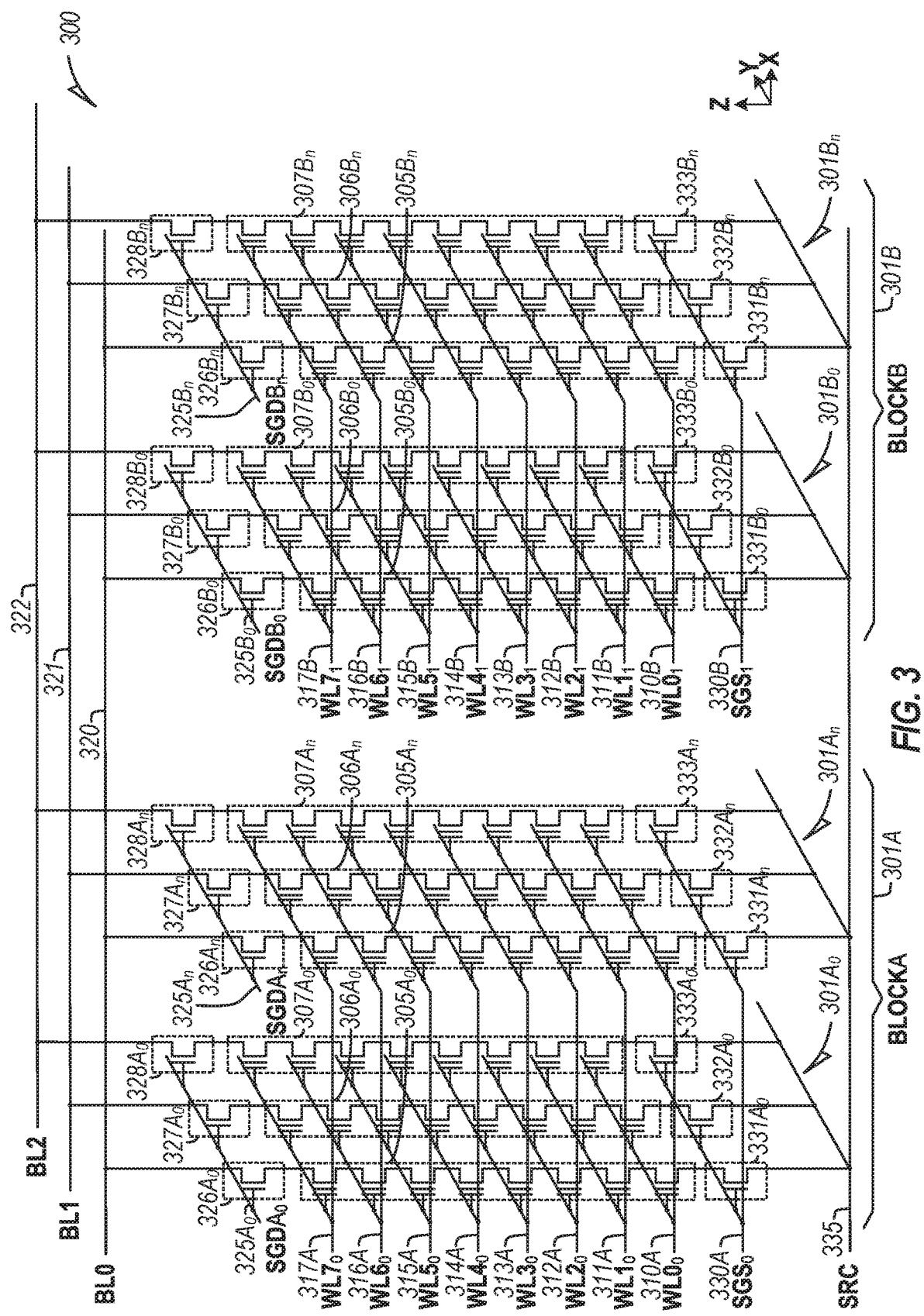
FIG. 3 illustrates an example schematic diagram of a 3D NAND architecture semiconductor memory array including a number of strings of memory cell.

FIG. 3 illustrates an example schematic diagram of a 3D NAND architecture semiconductor memory array 300 including a number of strings of memory cells (e.g., first-third $A_0$ memory strings $305A_0$-$307A_0$, first-third $A_n$ memory strings $305A_n$-$307A_n$, first-third $B_0$ memory strings $305B_0$-$307B_0$, first-third $B_n$ memory strings $305B_n$-$307B_n$, etc.), organized in blocks (e.g., block A 301A, block B 301B, etc.) and sub-blocks (e.g., sub-block $A_0$ 301$A_0$, sub-block $A_n$ 301$A_n$, sub-block $B_0$ 301$B_0$, sub-block $B_n$ 301$B_n$, etc.). The memory array 300 represents a portion of a greater number of similar structures than would typically be found in a block, device, or other unit of a memory device.

Each string of memory cells includes a number of tiers of charge storage transistors (e.g., floating gate transistors, charge-trapping structures, etc.) stacked in the Z direction, source to drain, between a source line (SRC) 335 or a source-side select gate (SGS) (e.g., first-third $A_0$ SGS $331A_0$-$333A_0$, first-third $A_n$ SGS $331A_n$-$333A_n$, first-third $B_0$ SGS $331B_0$-$333B_0$, first-third $B_n$ SGS $331B_n$-$333B_n$, etc.) and a drain-side select gate (SGD) (e.g., first-third $A_0$ SGD $326A_0$-$328A_0$, first-third $A_n$ SGD $326A_n$-$328A_n$, first-third $B_0$ SGD $326B_0$-$328B_0$, first-third $B_n$ SGD $326B_n$-$328B_n$, etc.). Each string of memory cells in the 3D memory array can be arranged along the X direction as data lines (e.g., bit lines (BL) BL0-BL2 320-322), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). The illustrated memory device provided for purposes of description includes two blocks, each block having two sub-blocks, each sub-block having a single physical page, with each physical page having three strings of memory cells, and each string having 8 tiers of memory cells. In actual devices, the memory array 300 will typically include a much greater number of blocks, sub-blocks, physical pages, strings of memory cells, memory cells, and/or tiers. For example, each string of memory cells can include a selected number of tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory device can include 18,592 bytes (B) of data per page (16,384+2208 bytes), 1536 pages per block, 548 blocks per plane, and 4 or more planes per device.

Each memory cell in the memory array 300 includes a control gate (CG) coupled to (e.g., electrically or otherwise operatively connected to) an access line (e.g., word lines (WL) $WL0_0$-$WL7_0$ 310A-317A, $WL0_1$-$WL7_1$ 310B-317B, etc.), which collectively couples the control gates (CGs) across a specific tier, or a portion of a tier, as desired. Specific tiers in the 3D memory array 300, and accordingly, specific memory cells in a string, can be accessed or controlled using respective access lines. Groups of select gates can be accessed using various select lines. For example, first-third $A_0$ SGD $326A_0$-$328A_0$ can be accessed using an $A_0$ SGD line $SGDA_0$ $325A_0$, first-third $A_n$ SGD $326A_n$-$328A_n$ can be accessed using an SGD line $SGDA_n$ $325A_n$, first-third $B_0$ SGD $326B_0$-$328B_0$ can be accessed using an $B_0$ SGD line $SGDB_0$ $325B_0$, and first-third $B_n$ SGD $326B_n$-$328B_n$ can be accessed using a $B_n$ SGD line $SGDB_n$ $325B_n$. First-third $A_0$ SGS $331A_0$-$333A_0$ and first-third $A_n$ SGS $331A_n$-$333A_n$ can be accessed using a gate select line $SGS_0$ 330A, and first-third $B_0$ SGS $331B_0$-$333B_0$ and first-third $B_n$ SGS $331B_n$-$333B_n$ can be accessed using a gate select line $SGS_1$ 330B.

In an example, the memory array 300 can include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

Figure 4:
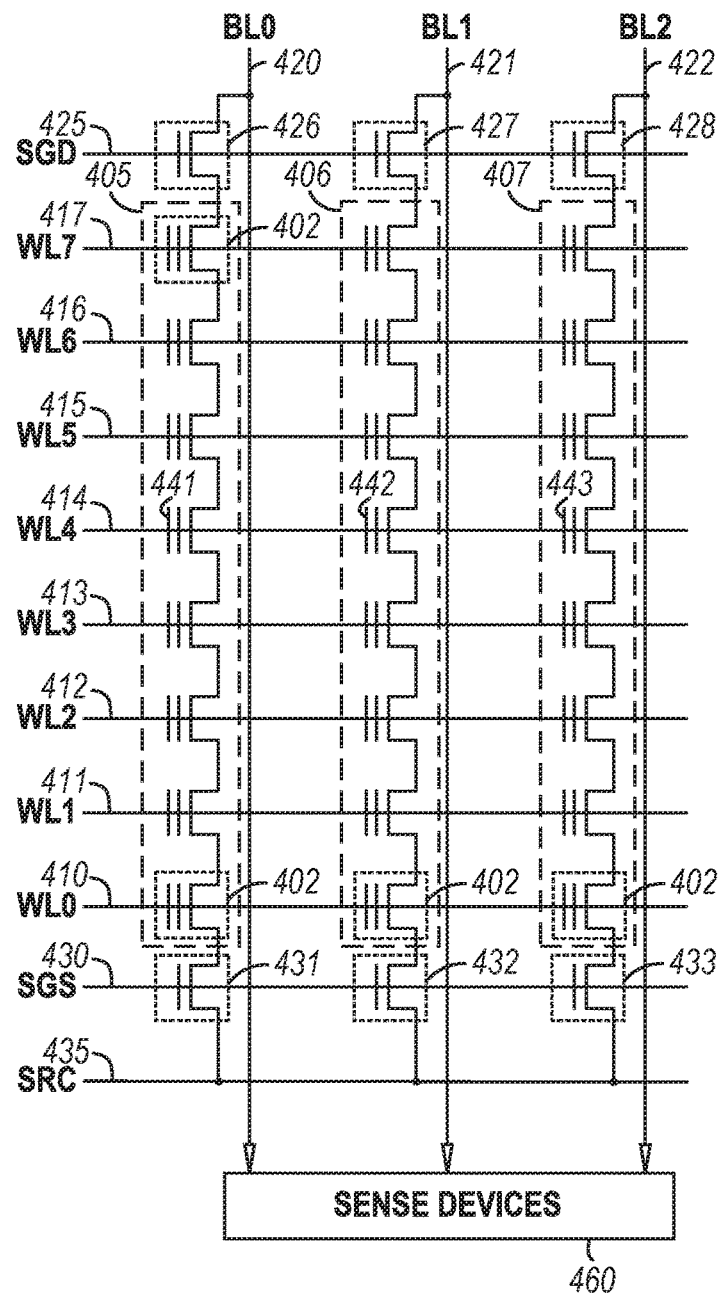
FIG. 4 illustrates an example schematic diagram of a portion of a NAND architecture semiconductor memory array including a plurality of memory cells arranged in a two-dimensional array of strings.

FIG. 4 illustrates an example schematic diagram of a portion of a NAND architecture semiconductor memory array 400 including a plurality of memory cells 402 arranged in a two-dimensional array of strings (e.g., first-third strings 405-407) and tiers (e.g., illustrated as respective word lines (WL) WL0-WL7 410-417, a drain-side select gate (SGD) line 425, a source-side select gate (SGS) line 430, etc.), and devices or sense amplifiers 460. For example, the memory array 400 can illustrate an example schematic diagram of a portion of one physical page of memory cells of a 3D NAND architecture semiconductor memory device, such as illustrated in FIG. 3.

Each string of memory cells is coupled to a source line (SRC) using a respective source-side select gate (SGS) (e.g., first-third SGS 431-433), and to a respective data line (e.g., first-third bit lines (BL) BL0-BL2 420-422) using a respective drain-side select gate (SGD) (e.g., first-third SGD 426-428). Although illustrated with 8 tiers (e.g., using word lines (WL) WL0-WL7 410-417) and three data lines (BL0-BL2 426-428) in the example of FIG. 4, other examples can include strings of memory cells having more or fewer tiers or data lines, as desired.

In a NAND architecture semiconductor memory array, such as the example memory array 400, the state of a selected memory cell 402 can be accessed by sensing a current or voltage variation associated with a particular data line containing the selected memory cell. The memory array 400 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., WL4), and thus, to a control gate of each memory cell coupled to the selected word lines (e.g., first-third control gates (CGs) 441-443 of the memory cells coupled to WL4). Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as WL4, a pass voltage of 10V can be applied to one or more other word lines, such as WL3, WL5, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to WL4, a pass voltage of 10V can be applied to WL3 and WL5, a pass voltage of 8V can be applied to WL2 and WL6, a pass voltage of 7V can be applied to WL1 and WL7, etc. In other examples, the pass voltages, or number of word lines, etc., can be higher or lower, or more or less.

The sense amplifiers 460, coupled to one or more of the data lines (e.g., first, second, or third bit lines (BL0-BL2) 420-422), can detect the state of each memory cell 402 in respective data lines by sensing a voltage or current on a particular data line. Sense amplifiers 460 can determine whether a state of a given memory cell 402 or set of cells is unstable. In such circumstances, sense amplifiers 460 can record this instability as an error parameter. Sense amplifiers 460 can communicate with a controller to correct the error parameter.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the floating gates of the targeted memory cells to the channels.

To read data from a given page of memory cells, a read threshold voltage or potential (Vt) is applied to the word lines and the voltage is sensed from the corresponding data lines. If a given cell is programmed, application of the Vt (or voltage within a range of Vt), can result in a given voltage level (within a programmed range) being sensed at the corresponding bit line. If the voltage level that is sensed is within the acceptable programmed range, a bit value of '0' can be determined to be stored in the given cell. If the given cell is not programmed, application of the Vt (or voltage within a range of Vt), can result in a given voltage level (within an erased range) being sensed at the corresponding bit line. If the voltage level that is sensed is within the acceptable erased range, a bit value of '1' can be determined to be stored in the given cell.

In addition to managing one or more of the above described functions for a managed NAND memory device, the memory controller may need to also manage power usage of the multiple NAND die of the memory device to provide a balance between the user experience, sometimes known as performance, and length of the interval between required battery charging events. As discussed above, to provide the best possible user experience for a mobile device, it would be logical to maintain full power to each memory die of each memory device of the mobile device. However, in doing so, a user may need to recharge the battery of the mobile device quite often. The present inventor(s) have recognized techniques to arbitrate various functions of a multiple die managed NAND device to conform the operation of the device to a power budget while attempting to providing the best user experience within that power budget.

FIG. 5 illustrates generally a flowchart of an example method 500 for a memory controller to arbitrate activation and de-activation of the die of a multiple memory die device to maintain as many active die as possible while still managing power consumption of the memory device to a power budget. In certain examples, an arbitration circuit of a memory controller can be programmed with a power budget scheme and possibly one or more parameters to indicate how many die of a multiple die NAND memory device can be activated or powered and still operate within the power budget. In some examples, the power budget scheme and parameters can be derived from benchmark testing of the memory device within the planned mobile environment. At 501, a subset of the die of the multiple die NAND memory device can be active or activated to operate within the power budget. At 503, an active timer for each newly active die can be initiated. In certain examples, initiation of a timer can include saving a timestamp, loading a preset value and enabling a countdown timer or counter, or resetting a counter and timer and enabling the counter or timer to begin accumulating time or counts. At 505, an inactive timer for each newly de-activated die of the multiple die NAND memory device can be initiated. At 507, the memory controller can begin routing or executing memory requests of the active memory die to the corresponding active memory die. In certain examples, the memory requests can be accumulated and buffered such as in a shift register, queue, plane queue, etc. At 509, the active timers can be evaluated to determine if any of the active die have been active for a preset interval.

If an active die has been active for a preset interval indicated, for example, by an expired active timer associated with the die, at 511, the memory controller can deactivate, or disable, the active die and at 513 can enable an inactive die determined to be inactive for the longest duration. If the active timer of the active die has not expired, at 515, the inactive timers can be evaluated to determine of any of the inactive timers have expired. In certain examples, a timer can be evaluated by comparing a value of the timer with a present value. In some examples, a timer can be evaluated by comparing a timestamp of the timer associated with when the timer was activated with a current time stamp to provide a duration of the timer. The duration can then be compared with a predetermined parameter value to determine if the timer has expired or not. In some examples, the memory controller can continue to route or execute memory requests of the active memory die when the active timer for each active die has not expired and when the inactive timer for each inactive die has not expired. As used herein, to "enable" a device can include providing power to the device such as by energizing the device, switching from a low-power, sleep, or standby mode to a higher power mode of the device, activating the device, or allowing operation of the device or communication between the device and another device. As used herein, to "disable" a device can include removing power to the device such as by de-energizing the device, switching from a high-power mode to a lower power mode of the device, such as a sleep or standby mode, deactivating or idling the device, or ceasing operation of the device or communication between the device and another device.

If an inactive die has been inactive for a present interval indicated, for example, by an expired inactive timer, at 517, the memory controller can deactivate the active die determined to be active for the longest duration, and at 519, can enable the inactive die associated with the expired inactive timer. The above arbitration method can assure that the multiple-die NAND memory device operates within a power budget while attempting to avoid buffering memory request for any one die for an extended period of time, as keeping a memory die inactive can eventually result in a deterioration of the user experience of the overall system. In certain examples, the method can represent a single sequential circuit or set of sequential instructions of the arbitration circuit.

Figure 6:
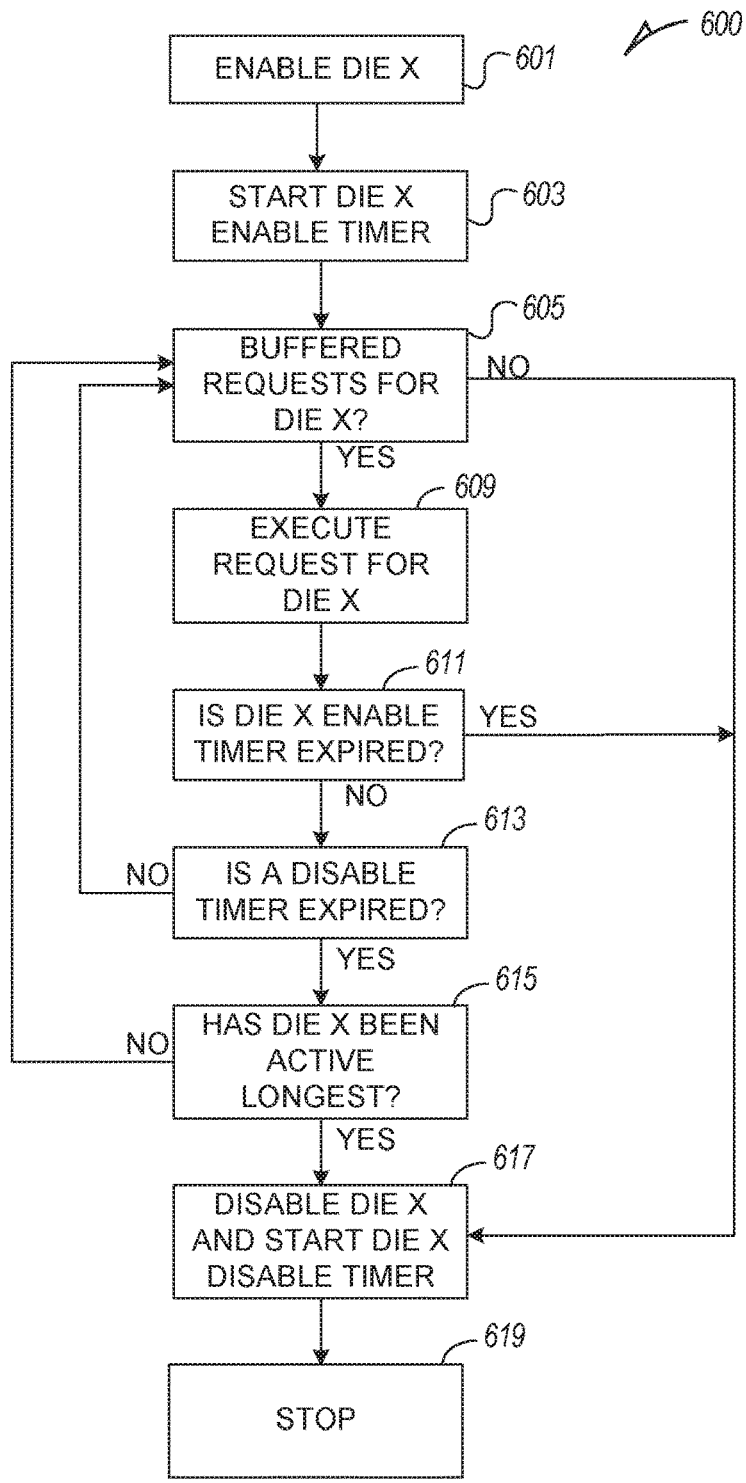
FIG. 6 illustrates generally a flowchart of an alternative, example method for a memory controller to arbitrate activation and de-activation of the die of a multiple memory die device to maintain as many active die as possible while still managing power consumption of the memory device to a power budget.

FIG. 6 illustrates generally a flowchart of an alternative, example method 600 for a memory controller to arbitrate activation and de-activation of the die of a multiple memory die device to maintain as many active die as possible while still managing power consumption of the memory device to a power budget. In certain examples, the method can be replicated and run in parallel with one or more other similar methods for each active die. At 601, a die can be enabled. The die may be one of a number of die of the memory system controlled by the memory controller. At any one time, the memory controller can have multiple die enabled and each can be executing the method 600 where "X" is a placeholder for the specific die enabled. At 603, an active timer can be started for the die (X). At 605, the memory controller can determine if any memory requests for the die (X) have been buffered. If there are no buffered memory requests for the die (X), the die (X) can be disabled, at 617. If there are buffered memory requests pending for the die (X), the memory requests can begin to be executed at 609. At 611, as memory request for the die (X) are executing, the active timer can be monitored and evaluated. In certain examples, each die can remain active for a predetermined interval. In some example, the predetermined interval is a fixed duration shared by each of the die. In some examples, the predetermined interval is dynamic and can change based on historic access to the die or knowledge of the type of data stored on the die.

If the active timer for the die (X) has elapsed or expired, the die (X) can be disabled, at 617. If the active timer for the die (X) has not expired, at 613, the memory controller can evaluate if any other die have been disable or inactive for too long by evaluating if any die have an expired disable timer. If none of the disable timers of the disabled, or inactive, die has expired, the memory controller can continue to have the die (X) execute any buffered commands at 605. If a disable timer of another die has expired, at 615, the memory controller can evaluate if the die (X) has been active the longest compared to other active die of the memory system. If the die (X) has not been enabled or active longer than any other currently active die, the memory controller can continue to have the die (X) execute any buffered commands at 605. If the die (X) has been active longer than any other currently active die, the memory controller at 617, can disable the die (X), start a disable timer associated with the die (X) and can end the method, at 619, until the die (X) becomes active again.

In certain examples, the controller can monitor the duration a buffered command is in the buffer or queue and can raise an idle limit indication when the buffered command has been in the buffer for an extended predetermined duration. Upon receiving an idle limit indication, the memory controller can activate the memory die associated with the buffered command, if not already active, and can allow the die to remain active until the buffered command is executed regardless of the active timer expiration of the memory die. In certain examples, a memory die may need to be deactivated to accommodate execution of the buffered command and comply with the power budget.

The present inventors have recognized an alternative arbitration mechanism configured to provide finer resolution to power estimation and management of a memory device compared to the mechanisms of FIGS. 5 and 6. In certain examples, the techniques discussed with respect to FIGS. 7 and 8 can be used in combination with the techniques of FIGS. 5 and 6.

Again, as an example, mobile storage devices that operate on a battery can have a power delivery network associated with the battery that can provide limited peak power responsiveness, in terms of terms of time and total current capacity. Mobile NAND storage can perform system read operations on a channel by executing multiple-plane read commands at the NAND device level and can perform system write operations on a channel by executing multiple-plane write commands at the NAND device level across some set of NAND devices in parallel. System read and write operation can have different power profiles, so mixed mode operation (where host traffic is a mix of read and write commands) can be difficult to manage within a limited power budget from a peak power perspective.

Figure 7:
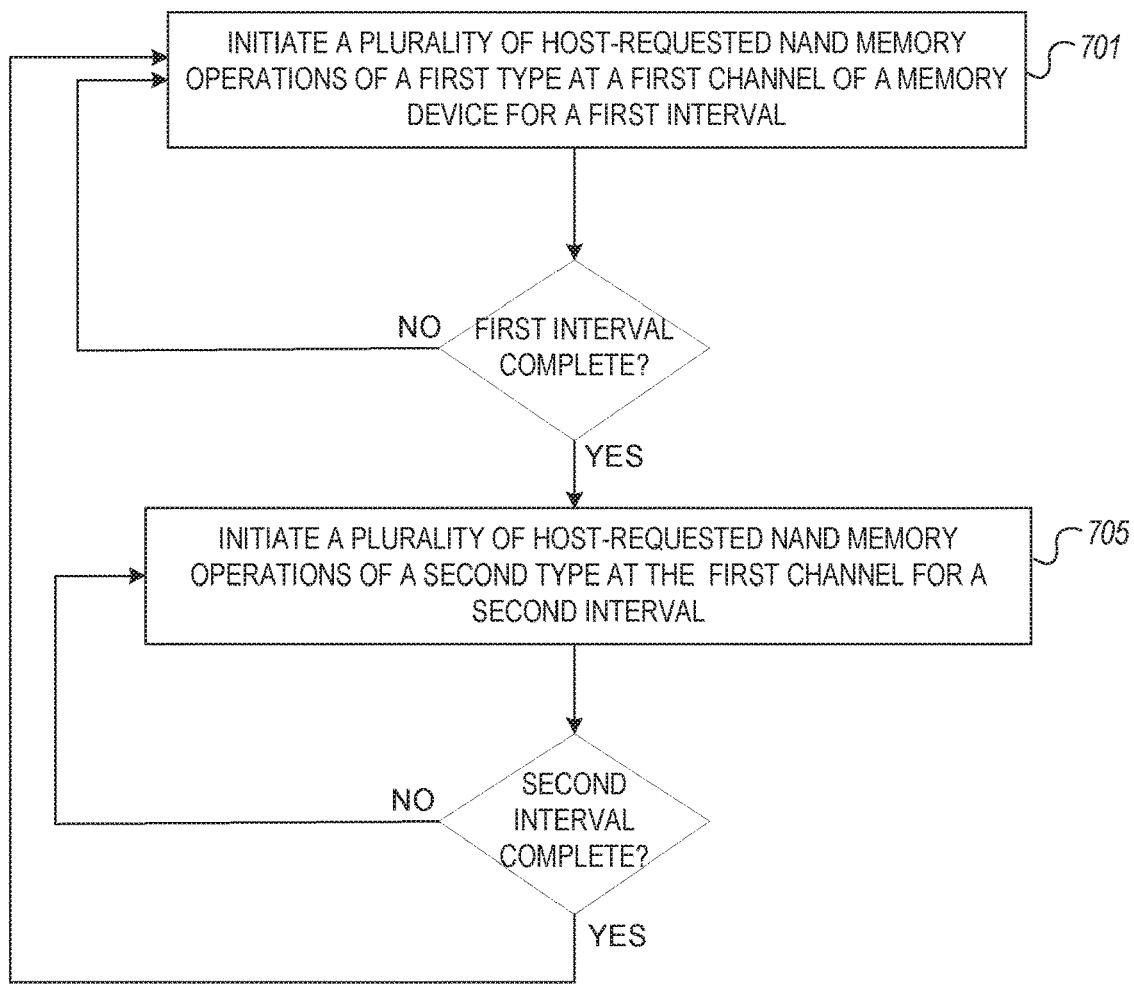
FIG. 7 illustrates generally a flow chart of an example method for operating a channel under an example arbitration scheme to conform an operation of a memory system to a power budget.
Figure 8:
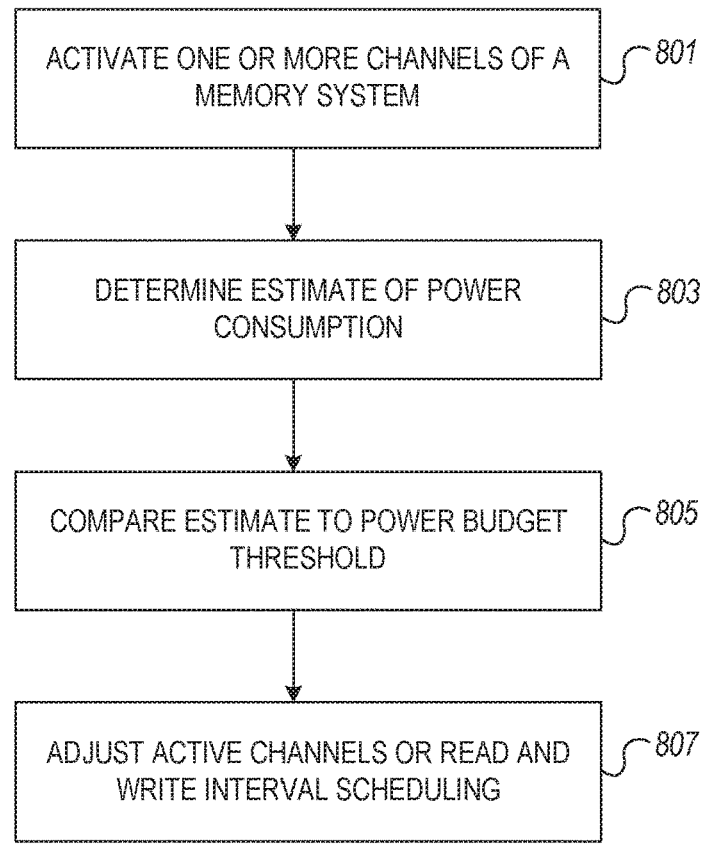
FIG. 8 illustrates generally a flow chart of an example method for arbitrating work load in a managed NAND memory device such that a power budget for the device can be met.

The example techniques of FIGS. 7 and 8 provide an arbitration mechanism, for example, for a NAND sequencer of a memory controller such as the controller 115, 215 of FIG. 1 or FIG. 2, that can monitor and evaluate incoming workload or memory requests from the host, translated to NAND operations, for example, by a FTL, such that all NAND channels and all NAND devices on those channels are allowed to execute read commands or write commands but not both during a given interval of time.

In certain examples, a power consumption profile of a read command can include a spike of current during a sense operation and then a constant level of current during data transfer from the memory device to the host. In general, a NAND read executes the sense operation prior to transferring the data. In some examples, a power consumption profile of a program or write command can include steady power consumption during data transfer from the host to the memory device and then repeated peaks as the program algorithm uses a set of pulses to push data onto the NAND cells. In general, a NAND write operation transfers data before pushing or programming the data to NAND cell.

When read operations and write operations are executed together on a NAND array during an interval of time, the mix of when data is transferred and when the sense or program algorithms are in a peak current operation can be complex. In conventional methods, to conform to a power budget, the controller would estimate a worst-case scenario for alignment of data transfers, sense operations and program operations for the number of parallel active die and the sequencing of operations across those die. Such a pessimistic algorithm can significantly limit overall performance.

In certain examples, an array of NAND devices within a die or stack of die, and associated channels, can be limited to executing only read commands for a certain interval of time, and then switched to be limited to executing only write commands for a second interval of time. In certain examples, the memory controller can alternate the read only mode and write only mode of active channels to alleviate any particular buffered read command or write command from pending for an extended time. It is understood that the power consumption profile of a write command and a read command for each channel of the memory device can be benchmarked and well understood. Consequently, the example modal operation of the memory device, where during a determined interval, all operations for a channel are of the same type, highly optimized individual active die count and command sequencing schemes can be determined by the controller for the read mode and write mode such that each mode provides high performance while conforming to the power budget.

FIG. 7 illustrates generally a flow chart of an example method 700 for operating a channel under an example arbitration scheme to conform an operation of a memory system to a power budget. In certain examples, the method 700 can allow for more utilization of the memory device while also conforming to a power budget. At 701, a plurality of homogeneous, host-requested NAND memory operations of a first type, such as a read operation, can be performed via a first channel of a memory device for a first interval. At 703, the expiration of the first interval can be monitored. If the first interval is not expired, or completed, the commands of the first type can continue to be executed on the first channel at 701. If the first interval expires, at 705, a plurality of homogeneous, host-requested NAND memory operations of a second type, such as a write operation, can be initiated via the first channel for a second interval. At 707, the expiration of the second interval can be monitored. If the second interval is not expired, or completed, the commands of the second type can continue to be executed on the first channel at 705. If the second interval expires, the method can repeat. In certain examples, the method can be run in parallel on a plurality of channels of the memory device. In some examples, the memory controller can enable or disable memory die coupled to each channel to allow operation of the memory device within a given power budget. In some examples, the memory controller can enable and disable channels of the memory device from performing the method 700 to conform operation of memory device to the power budget.

FIG. 8 illustrates generally a flow chart of an example method for arbitrating work load in a managed NAND memory device such that a power budget for the device can be met. In certain examples, the method can be combined with the one of the methods of FIG. 4 or FIG. 5 to provide a finer resolution to power consumption estimates. Such estimates can allow for more utilization of the memory device while also conforming to a power budget. In certain examples, at 801, the method can activate one or more channels of the memory system. In certain examples, activating a channel can include initiating the method 700 of FIG. 7 for each channel. At 803, the method can include determining a power estimate based on the number of active channels and the scheduling of intervals for each command type on each active channel. At 805, the estimate can be compared to a power budget to provide a power budget error. At 807, the number of active channels, the scheduling of the intervals for each command type on each active channel or a combination thereof can be adjusted to reduce the power budget error. For example, if the power budget error indicates the memory device is using more power than allowed by the power budget, the number of channels can be reduced, or the scheduling of the intervals can be adjusted to reduce power usage. In certain examples, the method can include arbitrating active die based, for example, on the techniques discussed regarding FIGS. 5 and 6.

The present inventors have recognized an additional arbitration mechanism configured to provide even finer resolution to power estimation and management of a memory system compared to the mechanism of FIGS. 7 and 8. In certain examples, the techniques discussed with respect to FIGS. 9 and 10 can be used in combination with the techniques of FIGS. 5-8.

Figure 9:
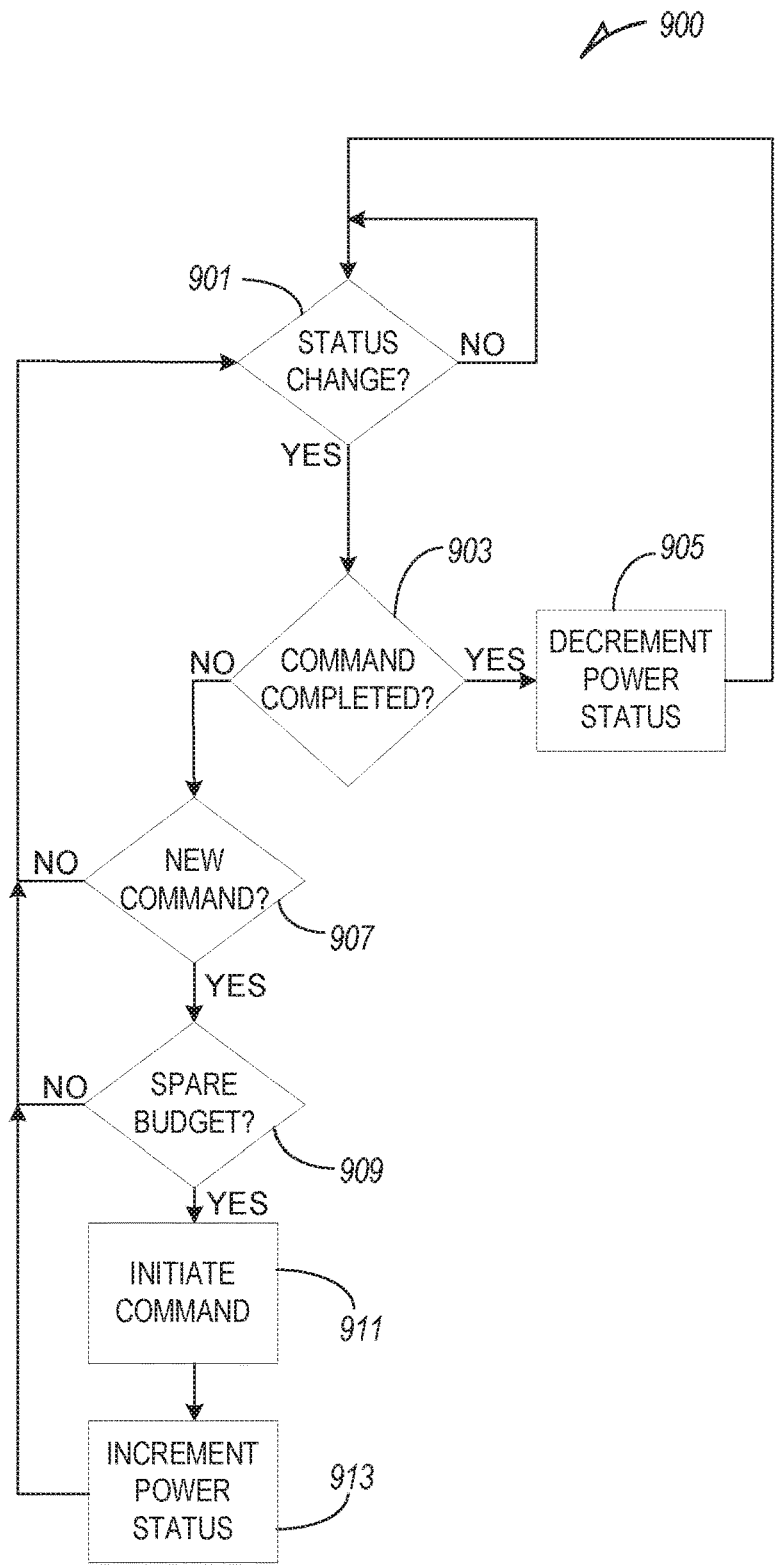
FIG. 9 illustrates generally a flowchart of an example method of operating a memory system to conform to power budget. In certain examples, the power budget can limit the maximum performance available from the memory system.

FIG. 9 illustrates generally a flowchart of an example method 900 of operating a memory system to conform to power budget. In certain examples, the power budget can limit the maximum performance available from the memory system. The arbitration method of FIG. 9 allows or mixed operations of the memory die by splitting certain flash memory operations into components and scheduling the components to make use of as much of a power budget as possible. Unlike the examples, of FIGS. 4-8, the memory operation components can allow for a finer resolution to power consumption estimates. Unlike the examples of FIGS. 7 and 8, the allowance of mixed command execution with the example techniques of FIGS. 9 and 10 can assist in providing better performance or at least a better user experience by not starving the host of a certain type of memory request.

As discussed above, a power consumption profile of a read command can include a spike, or peak, of current during a sense operation and then a constant level of current during data transfer from the memory device to the host. In general, a NAND read executes the sense operation prior to transferring the data. In some examples, a power consumption profile of a program or write command can include steady power consumption during data transfer from the host to the memory device and then repeated peaks, or spikes, as the program algorithm uses a set of pulses to push data onto the NAND cells. In general, a NAND write operation transfers data before pushing or programming the data to NAND cell. In certain examples, the command portions of the read command and write command that can include the current spikes can use more power than the constant current portions during the data transfer. In other examples, for example when data transfer rates are high, the constant current portions of the read and write commands can use more power than the command portions that include the current spikes.

When read operations and write operations are executed together on a NAND array during an interval of time, the mix of when data is transferred and when the sense or program algorithms are in a peak current operation can be complex. In conventional methods, to conform to a power budget, the controller would estimate a worst-case scenario for alignment of data transfers, sense operations and program operations for the number of parallel active die and the sequencing of operations across those die. Such a pessimistic algorithm can significantly limit overall performance.

The techniques discussed with regards to FIG. 9 allow the memory controller to individually schedule and command components of a number of memory requests to allow for even tighter power budget control and manipulation. In certain examples, the memory requests can include, but are not limited to, a read operation, a write operation and an erase operation. In certain examples, a read operation can be divided into two components: a sense operation and a read transfer. A sense operation can operate to sense bit values of data within the NAND cells to a page buffer. The read transfer can move the sensed bit values from the page buffer to the host interface. In certain examples, a write operation can be divided into two components: a write transfer and a program operation. The write transfer can move data from host interface to a page buffer on a NAND device and the program operation can program the data to NAND cells. The techniques of FIG. 9 allow the memory controller to more finitely control operations of the memory system so as to allow for mixed command execution.

In certain examples, the memory controller can receive a threshold power budget value which can be updated periodically. In some examples, the power budget threshold can be for the memory system, in other examples, the power budget threshold can be for a memory device, a memory die, a memory array, or for a channel between the memory controller and a number of memory die. In addition, the memory controller can include various status registers of devices or channels to monitor and sum instantaneous power usage and a compare the sum to the threshold power budget value. The memory controller can use a result of the comparison to arbitrate the schedule and command of the components of the memory requests. In some examples, the memory controller can use techniques associated with FIGS. 4-8, in addition to the techniques discussed below with respect to FIG. 9 to conform operation of a memory system with a given power budget.

At 901, the memory controller can monitor one or more status registers for a change. The status registers can indicate whether a new memory request has been received, whether command components are waiting to be issued, whether a command component has completed operation or a combination thereof. At 903, the memory controller can determine if execution of a component of a command has terminated. If execution of a component of a command has terminated, at 905, a power status register can be decremented to indicate that the instantaneous power consumption of the memory device has decreased. If execution of a component of a command has not terminated, at 907, the memory controller can determine if a component of a command is waiting to execute. If a component is not waiting to execute, control can return to checking for status changes at 901. If a component of a command is waiting to execute, at 909, the power associated with the component can be summed with a status register indicative of the instantaneous power consumption and the sum can be compared with the threshold power budget to determine if there is spare budget to allow the component to execute. In certain examples, spare budget can be indicated by the result of subtracting the instantaneous power consumption from the threshold power budget value. If there is spare power budget available, at 911, execution of the component of a command can be initiated, and, at 913, the status register can be updated with the sum to provide an updated status of the instantaneous power consumption of the memory device. In certain examples, the method 900 can use an ongoing estimate of power consumption to monitor compliance to a power budget and to use as much of the power budget as possible. In certain examples, the power budget can be monitored in terms of current consumption which can be a very good indicator of power when the voltage is relatively constant. In some examples, if spare budget does not exist to run a first component of a command, the memory controller can evaluate other buffered commands to see if another component of a command can be executed within the spare budget available. In situations where, for example, the overall power budget threshold is dynamically lowered, the memory system can sit in a loop until enough memory operation complete to allow for enough spare budget to begin initiating additional memory operations or components of commands.

Figure 10A:
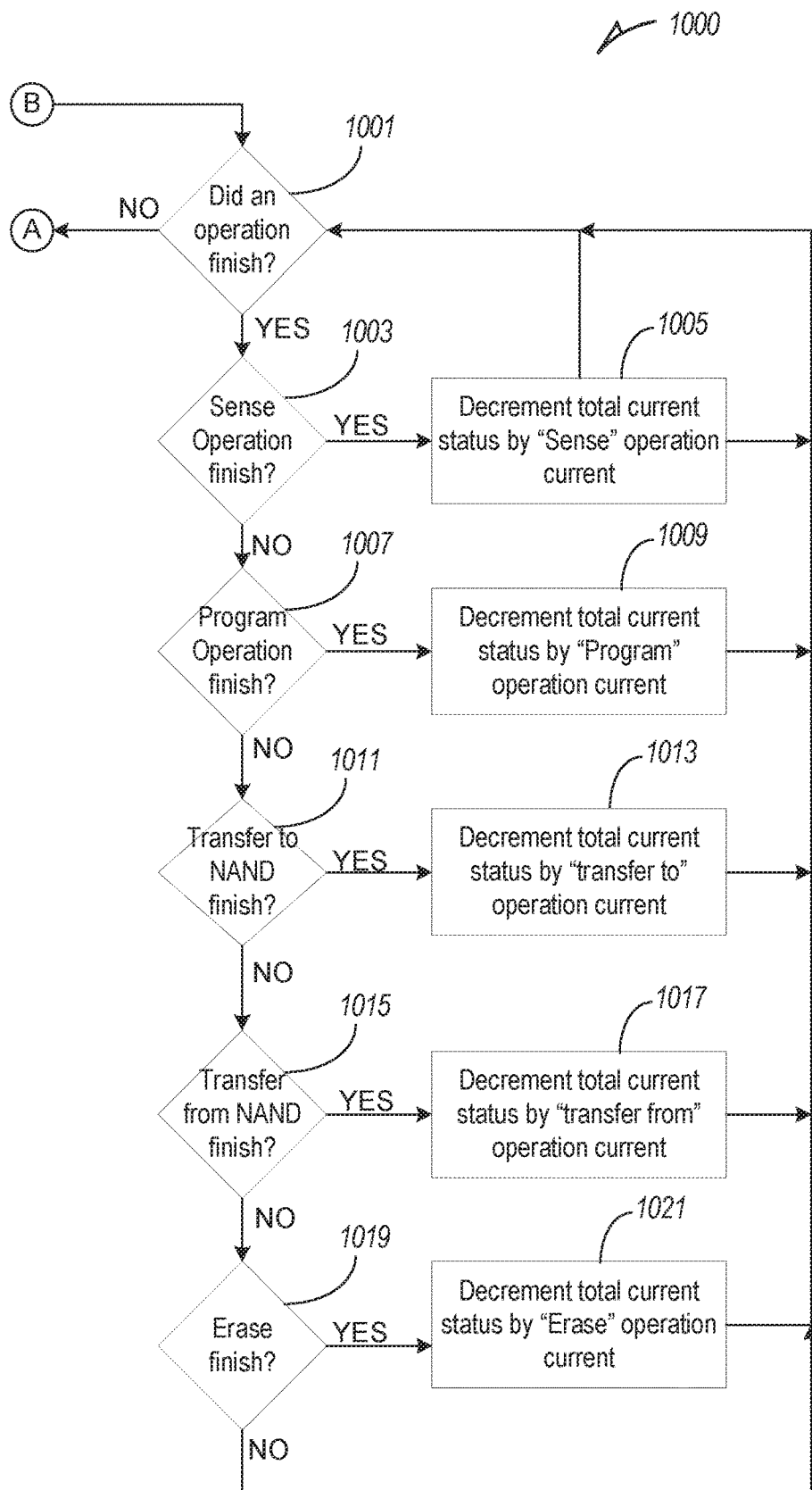
FIGS. 10A and 10B illustrate generally a more detailed example of the techniques of FIG. 9 and includes a flowchart of an example for operating a managed NAND memory system within a power budget.
Figure 10B:
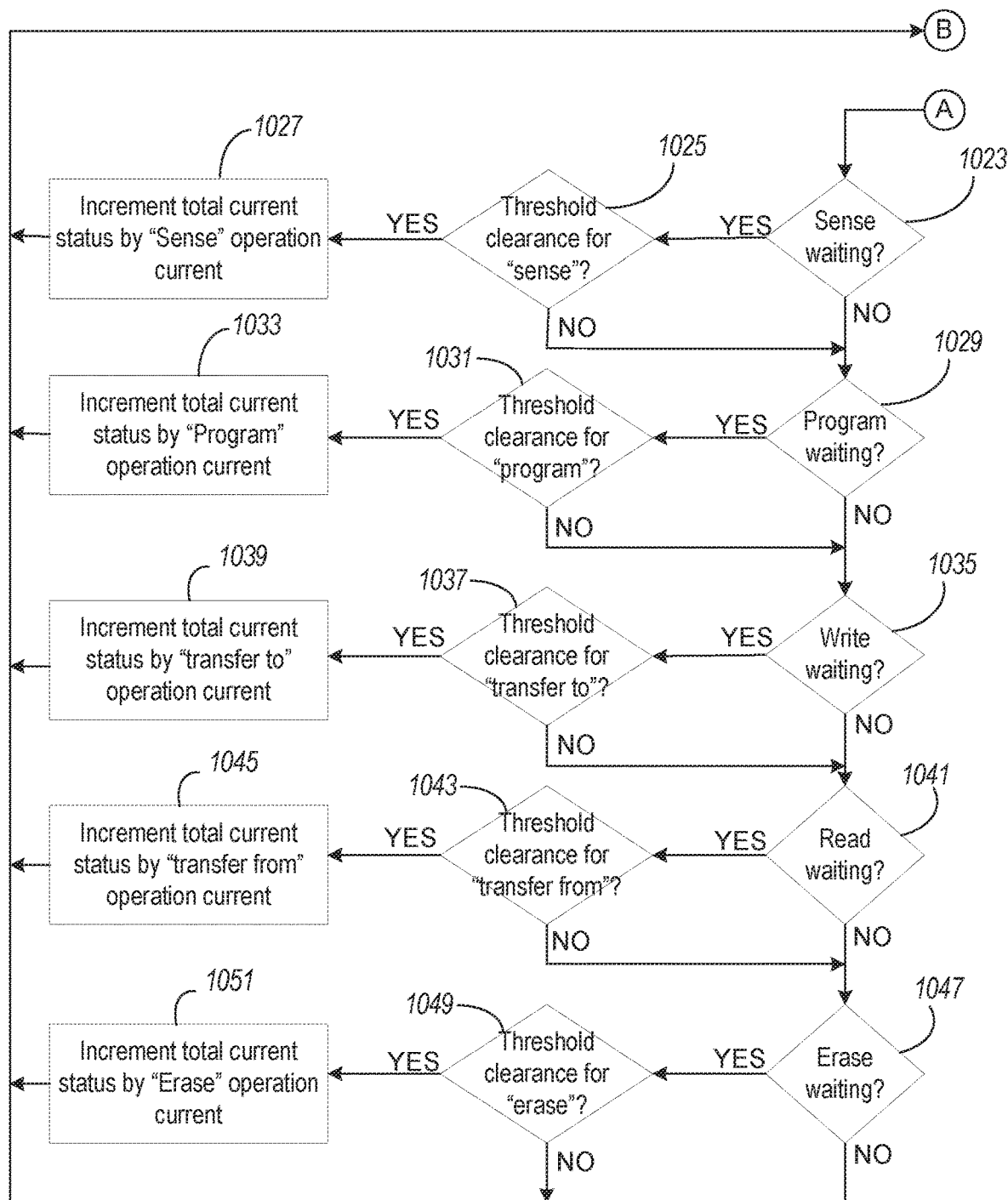

FIGS. 10A and 10B illustrate generally a more detailed example of the techniques of FIG. 9 and includes a flowchart of an example 1000 for operating a managed NAND memory system within a power budget. At 1001, the memory controller of the managed NAND memory system can evaluate whether a NAND memory operation associated with a host memory request has completed. If a NAND memory operation has completed, the method can evaluate what type of memory operation has completed and can update an instantaneous power consumption estimate. At 1003, the memory controller can determine if a "sense" operation completed. A sense operation can be a component of a read command of the NAND memory in response to a read request from the host. The "sense" operation can include conditioning certain conductors of the NAND memory to sense stored data to a page buffer, for example. A certain amount of power can be associated with executing a "sense" operation, thus when a "sense" operation completes, at 1005, a status register can be updated to provide an instantaneous indication of power consumption of the managed NAND memory system by subtracting, or decrementing, the register with a representation of the power associated with the "sense" operation. In certain examples, current can be representative of power and can be used as the value indicative of power consumption.

At 1007, the memory controller can determine if a "program" operation completed. A "program" operation can be a component of a write command of the NAND memory in response to a write request from the host. The "program" operation can include conditioning certain conductors of the NAND memory to store data from a page buffer to cells of the raw NAND memory circuits, for example. A certain amount of power can be associated with executing a "program" operation, thus, when a "program" operation completes, at 1009, a status register can be updated to provide an instantaneous indication of power consumption of the managed NAND memory system by subtracting, or decrementing, the register with a representation of the power associated with a "program" operation. In certain examples, current can be representative of power and can be used as the value indicative of power consumption.

At 1011, the memory controller can determine if a "transfer to NAND" operation completed. A "transfer to NAND" operation can be a second component of a write command of the NAND memory in response to a write request from the host. The "transfer to NAND" operation can move data from the host, or a host interface, to a page buffer for storing in a NAND memory circuit. In certain examples, a "transfer to NAND" operation is executed prior to a "program" operation, for example. A certain amount of power can be associated with executing a "transfer to NAND" operation, thus, when a "transfer to NAND" operation completes, at 1013, a status register can be updated to provide an instantaneous indication of power consumption of the managed NAND memory system by subtracting, or decrementing, the register with a representation of the power associated with a "transfer to NAND" operation. In certain examples, current can be representative of power and can be used as the value indicative of power consumption.

At 1015, the memory controller can determine if a "transfer from NAND" operation completed. A "transfer from NAND" operation can be a second component of a read command of the NAND memory in response to a read request from the host. The "transfer from NAND" operation can move data from a page buffer to the host, or a host interface. In certain examples, a "transfer from NAND" operation is executed after a "sense" operation, for example. A certain amount of power can be associated with executing a "transfer from NAND" operation, thus, when a "transfer from NAND" operation completes, at 1017, a status register can be updated to provide an instantaneous indication of power consumption of the managed NAND memory system by subtracting, or decrementing, the register with a representation of the power associated with just completed "transfer from NAND" operation. In certain examples, current can be representative of power and can be used as the value indicative of power consumption.

At 1015, the memory controller can determine if a "erase" operation completed. A "erase" operation can modify a NAND memory circuit or a table to indicate that one or more blocks of managed NAND memory are available to store data. A certain amount of power can be associated with executing a "erase" operation, thus, when an "erase" operation completes, at 1021, a status register can be updated to provide an instantaneous indication of power consumption of the managed NAND memory system by subtracting, or decrementing, the register with a representation of the power associated with just completed "erase" operation. In certain examples, current can be representative of power and can be used as the value indicative of power consumption.

Referring back to block 1001, if a status register does not indicate that a memory operation has completed, at 1023, the memory controller can determine if a "sense" operation is waiting to be executed. At 1025, if a "sense" operation is waiting to be executed, the memory controller can determine if execution of the "sense" operation can be accomplished without violating a power budget threshold. In certain examples, such a determination can be accomplished by adding the amount of power associated with the "sense" operation to the status register that provides an estimate of instantaneous power consumption of the memory system and comparing that temporary sum to the power budget threshold. If the temporary sum is less than the power budget threshold, at 1027, the "sense" operation can be initiated and the status register that provides an estimate of instantaneous power consumption of the memory system can be incremented by the amount of power associated with the "sense" operation. In certain examples, current can be representative of power and can be used as the value indicative of power consumption.

If, at 1025, it is determined that the "sense" operation can violate the power budget threshold, as may be indicated by the temporary sum being larger than the power budget threshold, or, at 1023, a "sense" command is not waiting to be executed, the memory controller, at 1029, can determine if a "program" operation is waiting to be executed. At 1031, if a "program" operation is waiting to be executed, the memory controller can determine if execution of the "program" operation can be accomplished without violating a power budget threshold. In certain examples, such a determination can be accomplished by adding the amount of power associated with the "program" operation to the status register that provides an estimate of instantaneous power consumption of the memory system and comparing that temporary sum to the power budget threshold. If the temporary sum is less than the power budget threshold, at 1033, the "program" operation can be initiated and the status register that provides an estimate of instantaneous power consumption of the memory system can be incremented by the amount of power associated with the "program" operation. In certain examples, current can be representative of power and can be used as the value indicative of power consumption.

If, at 1031, it is determined that the "program" operation can violate the power budget threshold, as may be indicated by the temporary sum being larger than the power budget threshold, or, at 1029, a "program" request is not waiting to be executed, the memory controller, at 1035, can determine if a "write" operation, or transfer to NAND" operation, is waiting to be executed. At 1037, if a "write" operation is waiting to be executed, the memory controller can determine if execution of the "write" operation can be accomplished without violating a power budget threshold. In certain examples, such a determination can be accomplished by adding the amount of power associated with the "write" operation to the status register that provides an estimate of instantaneous power consumption of the memory system and comparing that temporary sum to the power budget threshold. If the temporary sum is less than the power budget threshold, at 1039, the "write" operation can be initiated and the status register that provides an estimate of instantaneous power consumption of the memory system can be incremented by the amount of power associated with the "write" operation. In certain examples, current can be representative of power and can be used as the value indicative of power consumption.

If, at 1037, it is determined that the "write" operation can violate the power budget threshold, as may be indicated by the temporary sum being larger than the power budget threshold, or, at 1035, a "write" request is not waiting to be executed, the memory controller, at 1041, can determine if a "read" operation, or transfer from NAND" operation, is waiting to be executed. At 1043, if a "read" operation is waiting to be executed, the memory controller can determine if execution of the "read" operation can be accomplished without violating a power budget threshold. In certain examples, such a determination can be accomplished by adding the amount of power associated with the "read" operation to the status register that provides an estimate of instantaneous power consumption of the memory system and comparing that temporary sum to the power budget threshold. If the temporary sum is less than the power budget threshold, at 1045, the "read" operation can be initiated and the status register that provides an estimate of instantaneous power consumption of the memory system can be incremented by the amount of power associated with the "read" operation. In certain examples, current can be representative of power and can be used as the value indicative of power consumption.

If, at 1043, it is determined that the "read" operation can violate the power budget threshold, as may be indicated by the temporary sum being larger than the power budget threshold, or, at 1041, a "read" request is not waiting to be executed, the memory controller, at 1047, can determine if a "erase" operation is waiting to be executed. At 1049, if a "erase" operation is waiting to be executed, the memory controller can determine if execution of the "erase" operation can be accomplished without violating a power budget threshold. In certain examples, such a determination can be accomplished by adding the amount of power associated with the "erase" operation to the status register that provides an estimate of instantaneous power consumption of the memory system and comparing that temporary sum to the power budget threshold. If the temporary sum is less than the power budget threshold, at 1051, the "erase" operation can be initiated and the status register that provides an estimate of instantaneous power consumption of the memory system can be incremented by the amount of power associated with the "erase" operation. In certain examples, current can be representative of power and can be used as the value indicative of power consumption.

In certain examples, since the amount of power associated with each of the operations can be determined relatively precisely, the techniques of FIGS. 9, 10A and 10B can maintain a high level of utilization, or performance, of the memory system within the given power budget. It is understood that a managed NAND memory system can include more or less operations than those shown in the example methods of FIGS. 9, 10A and 10B without departing from the present subject matter. FIGS. 10A and 10B imply a particular prioritization as just one example of many possible prioritizations a controller may give to executing buffered requests and associated operations. In certain examples, relative ordering among the conditionals of the method of FIGS. 9, 10A, and 10B can be adjusted to meet different application priorities (for example, one system might prioritize read operations first and attempt to perform read transfers and initiate sense operations first; another might prioritize I/O and put read and write ahead of sense and program; etc.). It is understood that other prioritization of operations is possible without departing from the scope of the present subject matter.

Figure 11:
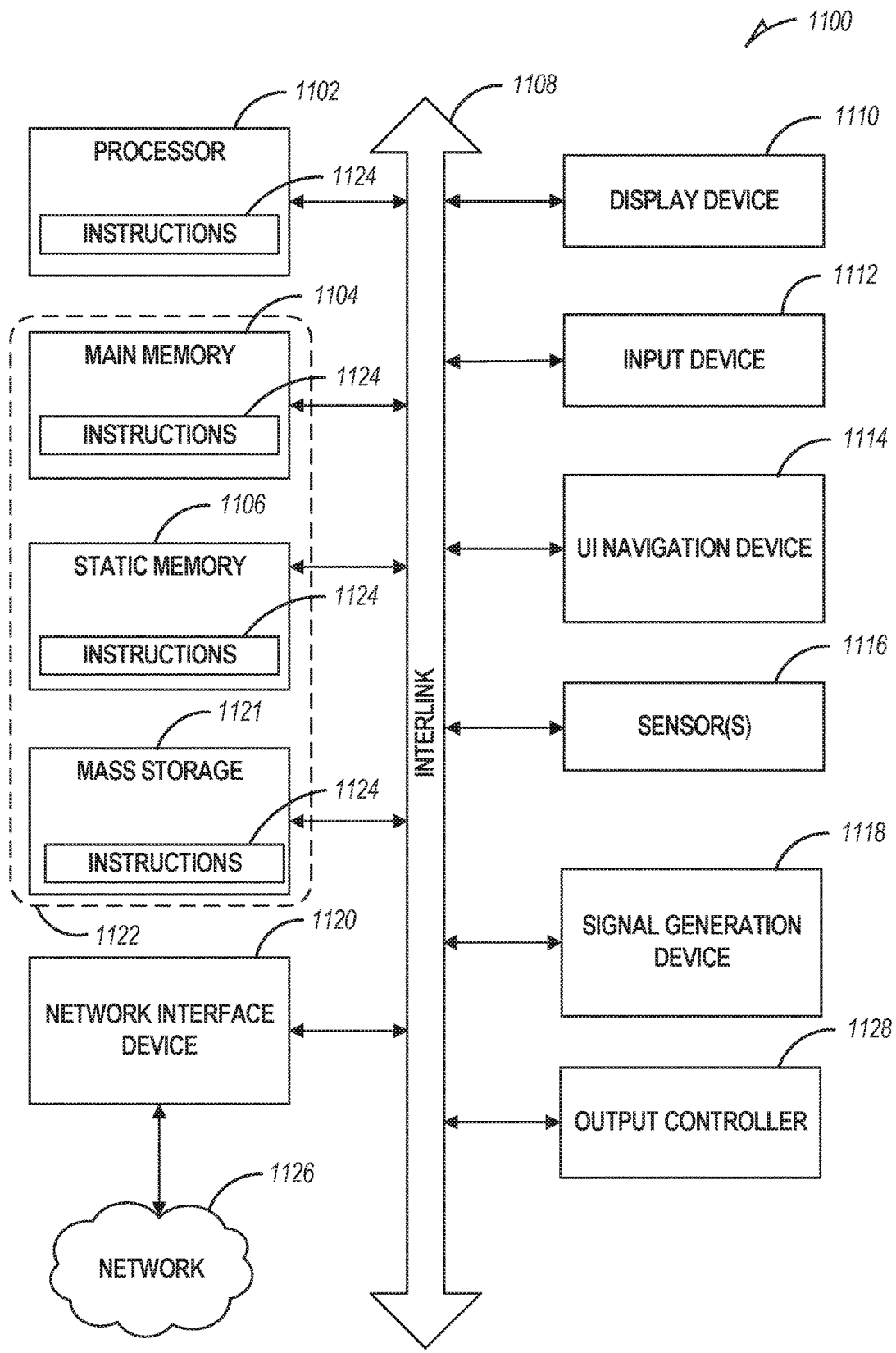
FIG. 11 is a block diagram illustrating an example of a machine upon which one or more embodiments can be implemented.

FIG. 11 illustrates a block diagram of an example machine 1100 upon which any one or more of the techniques (e.g., methodologies) discussed herein can perform. In alternative embodiments, the machine 1100 can operate as a standalone device or can be connected (e.g., networked) to other machines. In a networked deployment, the machine 1100 can operate in the capacity of a server machine, a client machine, or both in server-client network environments. In an example, the machine 1100 can act as a peer machine in peer-to-peer (P2P) (or other distributed) network environment. The machine 1100 can be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate by, logic, components, devices, packages, or mechanisms. Circuitry is a collection (e.g., set) of circuits implemented in tangible entities that include hardware (e.g., simple circuits, gates, logic, etc.). Circuitry membership can be flexible over time and underlying hardware variability. Circuitries include members that can, alone or in combination, perform specific tasks when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

The machine (e.g., computer system) 1100 (e.g., the host device 105, the managed memory device 110, etc.) can include a hardware processor 1102 (e.g., a central processing unit (CPU), a graphics processing unit (GPU), a hardware processor core, or any combination thereof, such as the memory controller 115, etc.), a main memory 1104 and a static memory 1106, some or all of which can communicate with each other via an interlink (e.g., bus) 1108. The machine 1100 can further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 can be a touch screen display. The machine 1100 can additionally include a storage device (e.g., drive unit), a signal generation device 1118 (e.g., a speaker), a network interface device 1120, one or more sensors 1116, such as a global positioning system (OPS) sensor, compass, accelerometer, or other sensor. The machine 1100 can include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

A machine-readable medium 1122 can include a storage device 1121 on which is stored one or more sets of data structures or instructions 1124 (e.g., software) embodying or utilized by any one or more of the techniques or functions described herein. The instructions 1124 can also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1121 can constitute the machine-readable medium 1122.

While the machine readable medium 1122 is illustrated as a single medium, the term "machine readable medium" can include a single medium or multiple media (e.g., a centralized or distributed database, or associated caches and servers) configured to store the one or more instructions 1124.

The term "machine readable medium" can include any transitory or non-transitory medium that is capable of storing, encoding, or carrying transitory or non-transitory instructions for execution by the machine 1100 and that cause the machine 1100 to perform any one or more of the techniques of the present disclosure, or that is capable of storing, encoding or carrying data structures used by or associated with such instructions. Non-limiting machine-readable medium examples can include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 (e.g., software, programs, an operating system (OS), etc.) other data are stored on the storage device 1121, can be accessed by the memory 1104 for use by the processor 1102. The memory 1104 (e.g., DRAM) is typically fast, but volatile, and is thus a different type of storage than the storage device 1121 (e.g., an SSD), which is suitable for long-term storage, including while in an "off" condition. The instructions 1124 or data in use by a user or the machine 1100 are typically loaded in the memory 1104 for use by the processor 1102. When the memory 1104 is full, virtual space from the storage device 1121 can be allocated to supplement the memory 1104; however, because the storage device 1121 is typically slower than the memory 1104, and write speeds are typically at least twice as slow as read speeds, use of virtual memory can greatly reduce user experience due to storage device latency (in contrast to the memory 1104, e.g., DRAM). Further, use of the storage device 1121 for virtual memory can greatly reduce the usable lifespan of the storage device 1121.

In contrast to virtual memory, virtual memory compression (e.g., the Linux® kernel feature "ZRAM") uses part of the memory as compressed block storage to avoid paging to the storage device 1121. Paging takes place in the compressed block until it is necessary to write such data to the storage device 1121. Virtual memory compression increases the usable size of memory 1104, while reducing wear on the storage device 1121.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing network speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 1124 can further be transmitted or received over a communications network 1126 using a transmission medium via the network interface device 1120 utilizing any one of a number of transfer protocols (e.g., frame relay, interne protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1120 can include one or more physical jacks (e.g., Ethernet, coaxial, or phone jacks) or one or more antennas to connect to the communications network 1126. In an example, the network interface device 1120 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software.

The above detailed description includes references to the accompanying drawings, which form a part of the detailed description. The drawings show, by way of illustration, specific embodiments in which the inventive subject matter can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, control circuitry, a digital signal processor (DSP), or any other type of processor or processing circuit, including a group of processors or multi-core devices.

It will be understood that when an element is referred to as being "on," "connected to" or "coupled with" another element, it can be directly on, connected, or coupled with the other element, or intervening elements can be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

It will be understood that the term "module" e.g., copyback module) can refer to any combination of software and circuitry to perform or configured to perform the described function. "Module" can refer to a programmable device, non-programmable device, ASIC, PLD, FGPA, or other dedicated or specific circuitry or hardware element configured to perform the described function. "Module" can refer to software (e.g., computer-readable instruction(s), code or a program running on a computer processor or control circuitry) configured to perform the described function.

Method examples described herein can be machine or computer-implemented at least in part. Some examples can include a transitory or non-transitory computer-readable medium or machine-readable medium encoded with transitory or non-transitory instructions operable to configure an electronic device to perform methods as described in the above examples. An implementation of such methods can include code, such as microcode, assembly language code, a higher-level language code, or the like. Such code can include computer-readable instructions for performing various methods. The code can form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

Additional examples of the devices and techniques described above follow:

Example 1 is a memory device comprising: multiple memory die, each memory die including multiple memory planes, and wherein each memory plane can receive and process memory commands independent of other memory planes; and a controller configured to buffer and trigger execution of the memory commands, to independently energize and de-energize each memory die of the multiple memory die, to time-stamp buffered memory commands and to energize and de-energize the multiple memory die based on a time-stamp of a buffered memory command.

In Example 2, the subject matter of Example 1, wherein the memory device includes NAND memory.

In Example 3, the subject matter of any of Examples 1-2, wherein the controller is configured to estimate an energy consumption of the memory device, to compare the estimate to a predetermined energy budget to provide an energy error, and to energize and de-energize the multiple memory die based on the time-stamp of the buffered memory command or on the energy error.

In Example 4, the subject matter of any of Examples 1-3, wherein the controller is configured to determine an energized interval of each energized memory die of the multiple memory die and to energize and de-energize the multiple memory die based on the time-stamp of the buffered memory command and on the energized interval of one or more energized memory die.

In Example 5, the subject matter of any of Examples 1-4, wherein the controller includes a queue for each memory die of the multiple memory die configured to store an indication of each buffered command for a corresponding memory die, to determine a buffered duration of a longest buffered command and to provide an idle limit indication to the controller when the buffered duration exceeds a predetermined idle threshold.

In Example 6, the subject matter of Example 5, wherein the controller is configured to receive the idle limit indication, to begin buffering commands of a longest energized die in response to the idle limit indication.

In Example 7, the subject matter of Example 6, wherein the controller is configured to determine when the longest energized die becomes idle, to de-energize the longest energized die, to energize a second die associated with the longest buffered command, and to transmit buffered commands of a respective queue to the second die.

In Example 8, the subject matter of any of Examples 1-7, wherein the controller includes a memory queue for each memory plane of the multiple memory die, each memory plane queue configured to store an indication of each buffered command for a corresponding memory plane, to determine a buffered duration of a longest buffered command, and to provide an idle limit indication to the controller when the buffered duration exceeds a predetermined idle threshold.

In Example 9, the subject matter of Example 8, wherein the controller is configured to receive the idle limit indication, and to begin buffering commands of a longest energized die in response to the idle limit indication.

In Example 10, the subject matter of Example 9, wherein the controller is configured to determine when the longest energized die becomes idle, to de-energize the longest energized die, to energize a second die associated with the longest buffered command, and to transmit buffered commands of a memory plane queue associated with the idle limit indication in response to energization of the second die.

In Example 11, the subject matter of Example 10, wherein the controller is configured to transmit buffered commands of each memory plane queue of the second die.

Example 12 is a method comprising: enabling a subset of memory die of a memory system having multiple memory die; starting an active timer for each active memory die; initializing execution of a buffered memory command at each active die based on a timestamp associated with the buffered memory command; and disabling a first memory die of the subset of memory die when the active timer for the first die expires to maintain compliance with a power budget of the memory system.

In Example 13, the subject matter of Example 12, wherein starting an active timer includes starting a deactivated timer for each disabled memory die of the memory system.

In Example 14, the subject matter of Example 13, including, when a first deactivated timer expires, determining a longest active memory die of the subset of memory die.

In Example 15, the subject matter of any of Examples 12-14, including disabling the longest active memory die and starting a deactivated timer associated with the longest active memory die.

In Example 16, the subject matter of Example 15, including determining a longest disabled memory die using the deactivated timer for each disabled memory die of the memory system.

In Example 17, the subject matter of Example 16, including activating the longest disabled memory die to provide a newly activated memory die and starting an active timer associated with the newly active memory die.

Example 18 is a machine-readable medium including instructions for power management of a NAND memory system, the instructions, when executed by processing circuitry, cause the processing circuitry to perform operations comprising: enabling a subset of memory die of a memory system having multiple memory die; starting an active timer for each active memory die; initializing execution of a buffered memory command at each active die based on a timestamp associated with the buffered memory command; and disabling a first memory die of the subset of memory die when the active timer for the first die expires to maintain compliance with a power budget of the memory system.

In Example 19, the subject matter of Example 18, wherein starting an active timer includes starting a deactivated timer for each disabled memory die of the memory system.

In Example 20, the subject matter of Example 19, wherein, when a first deactivated timer expires, the operations include determining a longest active memory die of the subset of memory die; disabling the longest active memory die to provide a newly deactivated memory die; starting a deactivated time associated with the newly deactivated memory die; determining a longest disabled memory die using the deactivated timer for each disabled memory die of the memory system; and activating the longest disabled memory die to provide a newly activated memory die and starting an active timer associated with the newly active memory die.

Example 21 is a method comprising: initiating a first plurality of host-requested NAND memory operations of a first type at a first channel of a memory device for a first interval; and at the completion of the first interval, performing a second plurality of homogeneous, host-requested NAND memory operations of a second type at the first multiple plane memory die for a second interval.

In Example 22, the subject matter of Example 21, wherein the first type of the host-requested NAND memory operations is a NAND read operation having a command power peak at a first power level followed by an output data transfer at a second power level; and wherein the initiating the first plurality of host-requested NAND memory operations of the first type includes: exclusively performing a plurality of NAND read operations; and timewise staggering the command power peak of each NAND read operation of the plurality of NAND read operations.

In Example 23, the subject matter of Example 22, wherein the second type of the host-requested NAND memory operations is a NAND write operation having a receive data transfer at a third power level followed by a plurality of command power peaks at a fourth power level; and wherein the initiating the second plurality of host-requested NAND memory operations of the second type includes: exclusively performing a plurality of NAND write operations during the second interval; and timewise staggering the plurality of command power peaks of each NAND write operation of the plurality of NAND write operations.

In Example 24, the subject matter of Example 23, wherein the third power level is less than the fourth power level.

In Example 25, the subject matter of any of Examples 23-24, wherein the second power level is less than the first power level.

In Example 26, the subject matter of any of Examples 21-25, wherein the first type of the host-requested NAND memory operations is a NAND write operation having a receive data transfer at a first power level followed by a plurality of command power peaks at a second power level; and wherein the initiating the first plurality of host-requested NAND memory operations of the first type includes: exclusively performing a plurality of NAND write operations during the first interval; and timewise staggering the plurality of command power peaks of each NAND write operation of the plurality of NAND write operations.

In Example 27, the subject matter of Example 26, wherein the second type of the host-requested NAND memory operations is a NAND read operation having a command power peak at a third power level followed by an output data transfer at a fourth power level; and wherein the initiating the second plurality of host-requested NAND memory operations of the second type includes: exclusively performing a plurality of NAND read operations during the second interval; and timewise staggering the command power peak of each NAND read operation of the plurality of NAND read operations.

In Example 28, the subject matter of Example 27, wherein the fourth power level is less than the third power level.

In Example 29, the subject matter of any of Examples 27-28, wherein the first power level is less than the second power level.

Example 30 is a NAND memory system comprising: a plurality of NAND multiple-plane memory arrays, wherein each memory array is configured to process read requests and write requests simultaneously in parallel; a controller configured to receive memory requests from a host device and service the requests using the plurality of NAND multiple-plane memory arrays within a power budget, wherein the memory requests can include read requests and write requests; wherein the memory controller is further configured, for a given multiple-plane memory array, to initiate a plurality of only read requests to the given multiple plane memory array for a first interval, and to initiate a plurality of only write requests to the given multiple plane memory array for a second interval following the first interval to conform an operation of the NAND memory system to the power budget; and wherein simultaneous operation of all the NAND multiple-plane memory arrays of the plurality of NAND multiple-plane memory arrays while processing memory requests is configured to exceed the power budget.

In Example 31, the subject matter of Example 30, wherein the controller is configured to buffer the memory requests to provide buffered read requests and buffered write requests, and to initiate and terminate the first and second intervals to conform to the power budget.

In Example 32, the subject matter of Example 31, wherein the memory controller is configured to enable and disable a subset of the plurality of multiple-plane memory arrays to conform operation of the NAND memory system to the power budget, and to ameliorate pendency of any one buffered read requests or any one buffered write request.

Example 33 is a machine-readable medium including instructions for power management of a NAND memory system, the instructions, when executed by processing circuitry, cause the processing circuitry to perform operations comprising: initiating a first plurality of host-requested NAND memory operations of a first type at a first channel of a memory device for a first interval; and at the completion of the first interval, performing a second plurality of host-requested NAND memory operations of a second type at the first multiple plane memory die for a second interval.

In Example 34, the subject matter of Example 33, wherein the first type of the host-requested NAND memory operations is a NAND read operation having a command power peak at a first power level followed by an output data transfer at a second power level; and wherein the initiating the first plurality of host-requested NAND memory operations of the first type includes: exclusively performing a plurality of NAND read operations during the first interval; and timewise staggering the command power peak of each NAND read operation of the plurality of NAND read operations.

In Example 35, the subject matter of Example 34, wherein the second type of the host-requested NAND memory operations is a NAND write operation having a receive data transfer at a third power level followed by a plurality of command power peaks at a fourth power level; and wherein the initiating the second plurality of host-requested NAND memory operations of the second type includes: exclusively performing a plurality of NAND write operations during the second interval; and timewise staggering the plurality of command power peaks of each NAND write operation of the plurality of NAND write operations.

In Example 36, the subject matter of Example 35, wherein the third power level is less than the fourth power level; and wherein the second power level is less than the first power level.

In Example 37, the subject matter of any of Examples 33-36, wherein the first type of the host-requested NAND memory operations is a NAND write operation having a receive data transfer at a first power level followed by a plurality of command power peaks at a second power level; and wherein the initiating the first plurality of host-requested NAND memory operations of the first type includes: exclusively performing a plurality of NAND write operations during the first interval; and timewise staggering the plurality of command power peaks of each NAND write operation of the plurality of NAND write operations.

In Example 38, the subject matter of Example 37, wherein the second type of the host-requested NAND memory operations is a NAND read operation having a command power peak at a third power level followed by an output data transfer at a fourth power level; and wherein the initiating the second plurality of host-requested NAND memory operations of the second type includes: exclusively performing a plurality of NAND read operations during the second interval; and timewise staggering the command power peak of each NAND read operation of the plurality of NAND read operations.

In Example 39, the subject matter of Example 38, wherein the fourth power level is less than the third power level; and wherein the first power level is less than the second power level.

In Example 40, the subject matter of Example 39, wherein the operations include enabling and disabling a subset of a plurality of multiple-plane memory arrays of the NAND memory system to conform operation of the NAND memory system to the power budget, and to ameliorate pendency of any one buffered read requests or any one buffered write request received from a host at the NAND memory system.

Example 41 is a method comprising: receiving an operation change indication for a NAND memory operation at power management circuitry of a NAND memory system; summing a power credit to a value of a first register associated with the operation change indication to provide an indication of instantaneous power consumption of the NAND memory system as the value of the first register, wherein, when the operation change indication is a first operation complete indication, the summing a power credit includes summing a negative first power credit with a value of the first register to provide the indication of instantaneous power consumption; and wherein, when the operation change indication is a first new command indication, the method includes: comparing a sum of a positive first power credit and the indication of instantaneous power consumption with a first power budget to provide a first sum; incrementing the indication of instantaneous power consumption with the first power credit if the first sum is less than the first power budget; and not incrementing the indication of instantaneous power consumption with the first power credit if the first sum is greater than the first power budget.

In Example 42, the subject matter of Example 41, wherein a first operation associated with the first operation change indication includes a program operation configured to program cells of a NAND memory array of the NAND memory system based on data of a buffer, for example, a buffer of a host.

In Example 43, the subject matter of any of Examples 41-42, wherein a first operation associated with the first operation change indication includes a write transfer operation configured to transfer data from a host across a communication channel to a NAND buffer.

In Example 44, the subject matter of any of Examples 41-43, wherein a first operation associated with the first operation change indication includes a sense operation configured to sense states of cells of a NAND memory array of the NAND memory system to a buffer.

In Example 45, the subject matter of any of Examples 41-44, wherein a first operation associated with the first operation change indication includes a read transfer operation configured to transfer data from a NAND buffer across a communication channel to a host.

In Example 46, the subject matter of any of Examples 41-45, wherein a first operation associated with the first operation change indication includes an erase operation.

In Example 47, the subject matter of any of Examples 41-46, wherein the power credit is a current value associated with a first operation associated with the first operation change indication.

Example 48 is a NAND memory system comprising: a plurality of NAND memory arrays, wherein each memory array is configured to process read requests and write requests simultaneously in parallel; a controller configured to receive memory requests from a host device and to service the requests using the plurality of NAND memory arrays within a power budget; wherein the controller is further configured to: receive an operation change indication for a NAND memory operation at power management circuitry of a NAND memory system; sum a power credit to a value of a first register associated with the operation change indication to provide an indication of instantaneous power consumption of the NAND memory system as the value of the first register; wherein, when the operation change indication is a first operation complete indication, the power credit includes a negative first power credit; and wherein, when the operation change indication is a first new command indication, the controller is configured to: compare a first sum with a first power budget, the first sum including of a positive first power credit and the indication of instantaneous power consumption; increment the indication of instantaneous power consumption with the first power credit when the first sum is less than the first power budget; and not modify the indication of instantaneous power consumption with the first power credit when the first sum is greater than the first power budget.

In Example 49, the subject matter of Example 48, wherein a first operation associated with the first operation change indication includes a program operation configured to program cells of a NAND memory array of the NAND memory system based on data of a buffer.

In Example 50, the subject matter of any of Examples 48-49, wherein a first operation associated with the first operation change indication includes a write transfer operation configured to transfer data from a host across a communication channel to a NAND buffer.

In Example 51, the subject matter of any of Examples 48-50, wherein a first operation associated with the first operation change indication includes a sense operation configured to sense states of cells of a NAND memory array of the NAND memory system to a buffer.

In Example 52, the subject matter of any of Examples 48-51, wherein a first operation associated with the first operation change indication includes a read transfer operation configured to transfer data from a NAND buffer across a communication channel to a host.

In Example 53, the subject matter of any of Examples 48-52, wherein a first operation associated with the first operation change indication includes an erase operation.

In Example 54, the subject matter of any of Examples 48-53, wherein the power credit is a current value associated with a first operation associated with the first operation change indication.

Example 55 is a machine-readable medium including instructions for power management of a NAND memory system, the instructions, when executed by processing circuitry, cause the processing circuitry to perform operations comprising: receiving an operation change indication for a NAND memory operation at power management circuitry of a NAND memory system; summing a power credit to a value of a first register associated with the operation change indication to provide an indication of instantaneous power consumption of the NAND memory system as the value of the first register, wherein, when the operation change indication is a first operation complete indication, the summing a power credit includes summing a negative first power credit with a value of the first register to provide the indication of instantaneous power consumption; and wherein, when the operation change indication is a first new command indication, the method includes: comparing a sum of a positive first power credit and the indication of instantaneous power consumption with a first power budget to provide a first sum; incrementing the indication of instantaneous power consumption with the first power credit if the first sum is less than the first power budget; and not incrementing the indication of instantaneous power consumption with the first power credit if the first sum is greater than the first power budget.

In Example 56, the subject matter of Example 55, wherein a first operation associated with the first operation change indication includes a program operation configured to program cells of a NAND memory array of the NAND memory system based on data of a buffer.

In Example 57, the subject matter of any of Examples 55-56, wherein a first operation associated with the first operation change indication includes a write transfer operation configured to transfer data from a host interface of the NAND memory system to a buffer.

In Example 58, the subject matter of any of Examples 55-57, wherein a first operation associated with the first operation change indication includes a sense operation configured to sense states of cells of a NAND memory array of the NAND memory system to a buffer.

In Example 59, the subject matter of any of Examples 55-58, wherein a first operation associated with the first operation change indication includes a read transfer operation configured to transfer data from a buffer to a host interface of the NAND memory system.

In Example 60, the subject matter of any of Examples 55-59, wherein a first operation associated with the first operation change indication includes an erase operation.

Example 61 is a method, comprising: receiving a first memory request for a first memory access operation at power management circuitry of a memory system, the first memory access operation at a location within a first portion of the memory system; evaluating a first power load associated with performing the first memory access operation relative to available power consumption of budgeted power consumption for at least the first portion of the memory system; determining that the first power load associated with performing the requested first memory access operation is within the available power consumption for at least the first portion of the memory system; and in response to such determination, executing the requested first memory access operation.

In Example 62, the subject matter of Example 61 includes, receiving a second request for a second memory access operation at the power management circuitry of the memory system, the second memory access operation at a location within the first portion of the memory system; evaluating a second power load associated with performing the second memory access operation relative to available power consumption of budgeted power consumption for at least the first portion of the memory system; determining that the second power load associated with performing the requested second memory access operation is outside available power consumption for at least the first portion of the memory system; and buffering the requested second memory access operation, until available power consumption of the budgeted power consumption is sufficient to enable executing of the requested second memory access operation.

In Example 63, the subject matter of Examples 61-62 includes, wherein the budgeted power consumption is established for an individual memory device within the memory system.

In Example 64, the subject matter of Examples 61-63 includes, wherein the budgeted power consumption is established for a channel of one or more memory devices within the memory system.

In Example 65, the subject matter of Examples 61-64 includes, wherein executing the first memory access operation results in a decrease of the available power of the budgeted power consumption of at least the first portion of the memory system.

In Example 66, the subject matter of Examples 61-65 includes, wherein completion of the first memory access operation results in an increase of the available power of the budgeted power consumption of at east the first portion of the memory system.

In Example 67, the subject matter of Examples 61-66 includes, wherein the available power of the budgeted power consumption is maintained in a first register providing a value indicating instantaneous power consumption in at least the first portion of the memory system.

In Example 68, the subject matter of Example 67 includes, wherein evaluating the first power load relative to the available power consumption comprises summing the first power load with the value of instantaneous power consumption in at least the first portion of the memory system and comparing the summed value to the budgeted power consumption.

Example 69 is a memory system comprising: multiple memory die; a controller coupled to each memory die of the multiple memory die with one or more channels, the controller configured to receive multiple memory requests and service the requests using the multiple memory die within a power budget; wherein the memory controller includes, power management circuitry configured to: receive a first memory request of the multiple memory requests for a first memory access operation at a location within a first portion of the memory system; evaluate a first power load associated with performing the first memory access operation relative to available power consumption of a budgeted power consumption for at least the first portion of the memory system; determine that the first power load associated with performing the requested first memory access operation is within the available power consumption for at least the first portion of the memory system; and in response to such determination, executing the requested first memory access operation.

In Example 70, the subject matter of Example 69 includes, wherein the power management circuitry is further configured to: receive a second request of the multiple memory requests for a second memory access operation at a location within the first portion of the memory system; evaluate a second power load associated with performing the second memory access operation relative to the available power consumption of the budgeted power consumption for at least the first portion of the memory system; determine that the second power load associated with performing the requested second memory access operation is outside the available power consumption for at least the first portion of the memory system; and buffer the requested second memory access operation, until available power consumption of the budgeted power consumption is sufficient to enable executing of the requested second memory access operation.

In Example 71, the subject matter of Examples 69-70 includes, wherein the budgeted power consumption is established for an individual memory die of the multiple memory die.

In Example 72, the subject matter of Examples 69-71 includes, wherein the budgeted power consumption is established for a channel of one or more memory die of the multiple memory die.

In Example 73, the subject matter of Examples 69-72 includes, wherein executing the first memory access operation results in a decrease of the available power of the budgeted power consumption of at least the first portion of the memory system.

In Example 74, the subject matter of Examples 69-73 includes, wherein completion of the first memory access operation results in an increase of the available power of the budgeted power consumption of at least the first portion of the memory system.

In Example 75, the subject matter of Examples 69-74 includes, wherein the available power of the budgeted power consumption is maintained in a first register providing a value indicating instantaneous power consumption in at least the first portion of the memory system.

In Example 76, the subject matter of Example 75 includes, wherein evaluating the first power load relative to the available power consumption comprises summing the first power load with the value of instantaneous power consumption in at least the first portion of the memory system and comparing the summed value to the budgeted power consumption.

Example 77 is a machine-readable medium including instructions for power management of a NAND memory system, the instructions, when executed by processing circuitry, cause the processing circuitry to perform operations comprising: receiving a first memory request for a first memory access operation at power management circuitry of a memory system, the first memory access operation at a location within a first portion of the memory system; evaluating a first power load associated with performing the first memory access operation relative to available power consumption of budgeted power consumption for at least the first portion of the memory system; determining that the first power load associated with performing the requested first memory access operation is within the available power consumption for at least the first portion of the memory system; and in response to such determination, executing the requested first memory access operation.

In Example 78, the subject matter of Example 77 includes, operations to perform: receiving a second request for a second memory access operation at the power management circuitry of the memory system, the second memory access operation at a location within the first portion of the memory system; evaluating a second power load associated with performing the second memory access operation relative to available power consumption of budgeted power consumption for at least the first portion of the memory system; determining that the second power load associated with performing the requested second memory access operation is outside available power consumption for at least the first portion of the memory system; and buffering the requested second memory access operation, until available power consumption of the budgeted power consumption is sufficient to enable executing of the requested second memory access operation.

In Example 79, the subject matter of Examples 77-78 includes, wherein executing the first memory access operation results in a decrease of the available power of the budgeted power consumption of at least the first portion of the memory system; and wherein completion of the first memory access operation results in an increase of the available power of the budgeted power consumption of at east the first portion of the memory system.

In Example 80, the subject matter of Examples 77-79 includes, wherein the budgeted power consumption is established for a channel of one or more memory die of the multiple memory die.

Example 81 is at least one machine-readable medium including instructions that, when executed by processing circuitry, cause the processing circuitry to perform operations to implement of any of Examples 1-80.

Example 82 is an apparatus comprising means to implement of any of Examples 1-80.

Example 83 is a system to implement of any of Examples 1-80.

Example 84 is a method to implement of any of Examples 1-80.

The above description is intended to be illustrative, and not restrictive. The scope of the inventive subject matter should be determined with reference to the appended claims, along with the full scope of equivalents to which such claims are entitled.

The invention claimed is:

1. A method, comprising:
    enabling a first subset of multiple memory die of a NAND memory system;
    starting an active timer for each of the memory die in the first subset; disabling a second subset of multiple memory die of the NAND memory system, the second subset including a first memory die;
    starting an inactive timer for each die of the second subset of memory die of the NAND memory system;
    receiving a first memory request for a first memory access operation at power management circuitry of the NAND memory system, the first memory access operation corresponding to a location within a first portion of the NAND memory system, the first portion including the first die, the first memory request comprising a read request or a write request;
    determining that the first memory request is for an inactive die;
    responsive to determining that the first memory request is for the inactive die, buffering the first memory request;
    determining that an inactive timer for the first memory die has expired;
    responsive to determining that the inactive timer for the first memory die has expired, determining that a second memory die has an active timer that is a longest pending active timer of all other memory die in the enabled subset;
    responsive to determining that the second memory die has the longest pending active timer, deactivating the second memory die and activating the first memory die;
    and responsive to activating the first memory die:
    retrieving the buffered first memory request;
    splitting the first memory request into a plurality of component operations selected from a set of possible component operations based upon a type of the first memory request, the set of possible component operations comprising sense, program, transfer to NAND, transfer from NAND, and erase operations;

determining a first power load corresponding to performing a first component operation of the plurality of component operations;
determining whether a sum of the first power load and a current power consumption exceeds a budgeted power consumption for the first die; and
responsive to determining that the sum of the first power load and the current power consumption does not exceed the budgeted power consumption, executing the first component operation of the plurality of component operations.

2. The method of claim 1, comprising:
determining a second power load corresponding to performing a second component operation of the plurality of component operations;
determining whether a sum of the second power load and the current power consumption exceeds the budgeted power consumption; and
responsive to determining that the sum of the second power load and the current power consumption exceeds the budgeted power consumption, buffering the second component operation of the plurality of component operations.

3. The method of claim 1, wherein the budgeted power consumption is established for an individual memory device within the NAND memory system.

4. The method of claim 1, wherein the budgeted power consumption is established for a channel of an individual memory device within the NAND memory system.

5. The method of claim 1, wherein executing the first component operation of the plurality of component operations results in an increase of the current power consumption.

6. The method of claim 1, wherein completion of the first component operation of the plurality of component operations results in a decrease in the current power consumption.

7. The method of claim 1, wherein the current power consumption is maintained in a first register.

8. A NAND memory system comprising:
multiple memory die;
a memory controller coupled to the multiple memory die with one or more channels, the memory controller configured to receive multiple memory requests and service the memory requests using the multiple memory die within a power budget;
wherein the memory controller includes power management circuitry configured to perform operations comprising:
enabling a first subset of the multiple memory die of the NAND memory system;
starting an active timer for each of the memory die in the first subset;
disabling a second subset of multiple memory die of the NAND memory system, the second subset including a first memory die;
starting an inactive timer for each die of the second subset of memory die of the NAND memory system;
receiving a first memory request for a first memory access operation at the power management circuitry, the first memory access operation corresponding to a location within a first portion of the NAND memory system, the first portion including the first die, the first memory request comprising a read request or a write request;
determining that the first memory request is for an inactive die;
responsive to determining that the first memory request is for the inactive die, buffering the first memory request;
determining that an inactive timer for the first memory die has expired;
responsive to determining that the inactive timer for the first memory die has expired, determining that a second memory die has an active timer that is a longest pending active timer of all other memory die in the enabled subset;
responsive to determining that the second memory die has the longest pending active timer, deactivating the second memory die and activating the first memory die; and
responsive to activating the first memory die:
retrieving the buffered first memory request;
splitting the first memory request into a plurality of component operations selected from a set of possible component operations based upon a type of the first memory request, the set of possible component operations comprising sense, program, transfer to NAND, transfer from NAND, and erase operations;
determining a first power load corresponding to performing a first component operation of the plurality of component operations;
determining whether a sum of the first power load and a current power consumption exceeds a budgeted power consumption for the first die; and
responsive to determining that the sum of the first power load and the current power consumption does not exceed the budgeted power consumption, executing the first component operation of the plurality of component operations.

9. The memory system of claim 8, wherein the operations further comprise:
determining a second power load corresponding to performing a second component operation of the plurality of component operations;
determining whether a sum of the second power load and the current power consumption exceeds the budgeted power consumption; and
responsive to determining that the sum of the second power load and the current power consumption exceeds the budgeted power consumption, buffering the second component operation of the plurality of component operations.

10. The memory system of claim 8, wherein the budgeted power consumption is established for an individual memory die of the multiple memory die.

11. The memory system of claim 8, wherein the budgeted power consumption is established for a channel of an individual memory die of the multiple memory die.

12. The memory system of claim 8, wherein executing the first component operation of the plurality of component operations results in an increase in current power consumption.

13. The memory system of claim 8, wherein completion of the first component operation of the plurality of component operations results in a decrease in current power consumption.

14. The memory system of claim 8, wherein the current power consumption is maintained in a first register.

15. A non-transitory machine-readable medium including instructions for power management of a NAND memory system, the instructions, when executed by processing circuitry, cause the processing circuitry to perform operations comprising:
enabling a first subset of multiple memory die of a NAND memory system;

starting an active timer for each of the memory die in the first subset;

disabling a second subset of multiple memory die of the NAND memory system, the second subset including a first memory die;

starting an inactive timer for each die of the second subset of memory die of the NAND memory system;

receiving a first memory request for a first memory access operation at power management circuitry of the NAND memory system, the first memory access operation corresponding to a location within a first portion of the memory system, the first portion including the first die, the first memory request comprising a read request or a write request;

determining that the first memory request is for an inactive die;

responsive to determining that the first memory request is for the inactive die, buffering the first memory request;

determining that an inactive timer for the first memory die has expired;

responsive to determining that the inactive timer for the first memory die has expired, determining that a second memory die has an active timer that is a longest pending active timer of all other memory die in the enabled subset;

responsive to determining that the second memory die has the longest pending active timer, deactivating the second memory die and activating the first memory die; and responsive to activating the first memory die:

retrieving the buffered first memory request;

splitting the first memory request into a plurality of component operations selected from a set of possible component operations based upon a type of the first memory request, the set of possible component operations comprising sense, program, transfer to NAND, transfer from NAND, and erase operations;

determining a first power load corresponding to performing a first component operation of the plurality of component operations;

determining whether a sum of the first power load and a current power consumption exceeds a budgeted power consumption for the first portion of the memory system; and responsive to determining that the sum of the first power load and the current power consumption does not exceed the budgeted power consumption, executing the first component operation of the plurality of component operations.

16. The non-transitory machine-readable medium of claim 15, including operations to perform:

determining a second power load corresponding to performing a second component operation of the plurality of component operations;

determining whether a sum of the second power load and the current power consumption exceeds the budgeted power consumption; and responsive to determining that the sum of the second power load and the current power consumption exceeds the budgeted power consumption, buffering the second component operation of the plurality of component operations.

17. The non-transitory machine-readable medium of claim 15, wherein executing the first component operation of the plurality of component operations results in an increase in current power consumption; and wherein completion of the first component operation of the plurality of component operations results in a decrease in current power consumption.

18. The non-transitory machine-readable medium of claim 15, wherein the budgeted power consumption is established for a channel of an individual memory die of multiple memory die of the NAND memory system.

\* \* \* \* \*